(12) United States Patent
Chu et al.

(10) Patent No.: US 12,027,093 B2
(45) Date of Patent: Jul. 2, 2024

(54) SPLICED SCREEN AND METHOD FOR COMPENSATING DISPLAY OF THE SPLICED SCREEN

(71) Applicant: BOE Technology Group Co., Ltd., Beijing (CN)

(72) Inventors: Mingi Chu, Beijing (CN); Ying Han, Beijing (CN); Fei Yang, Beijing (CN); Lirong Wang, Beijing (CN); Yi Chen, Beijing (CN); Yu Wang, Beijing (CN); Jingbo Xu, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/547,883

(22) PCT Filed: Dec. 30, 2021

(86) PCT No.: PCT/CN2021/143235
§ 371 (c)(1),
(2) Date: Aug. 25, 2023

(87) PCT Pub. No.: WO2023/123240
PCT Pub. Date: Jul. 6, 2023

(65) Prior Publication Data
US 2024/0153430 A1    May 9, 2024

(51) Int. Cl.
G09G 3/20    (2006.01)

(52) U.S. Cl.
CPC ..... *G09G 3/2074* (2013.01); *G09G 2300/026* (2013.01); *G09G 2300/0452* (2013.01);
(Continued)

(58) Field of Classification Search
USPC .......................................... 345/694
See application file for complete search history.

(56) References Cited

U.S. PATENT DOCUMENTS

2005/0134525 A1* 6/2005 Tanghe ................ G06F 3/1446
345/1.1
2007/0052662 A1* 3/2007 Kim .................. G02F 1/133605
345/102
(Continued)

FOREIGN PATENT DOCUMENTS

CN    102270445 A    12/2011
CN    103531175 A    1/2014
(Continued)

OTHER PUBLICATIONS

Written Opinion from PCT/CN2021/143235 dated Aug. 22, 2022.
International Search Report from PCT/CN2021/143235 dated Aug. 22, 2022.

*Primary Examiner* — Chineyere D Wills-Burns
(74) *Attorney, Agent, or Firm* — Calfee, Halter & Griswold LLP

(57) ABSTRACT

A method for compensating display of a spliced screen, including: obtaining a picture to be displayed; obtaining a theoretical brightness gain of at least one sub-display region in a plurality of sub-display regions; obtaining an actual brightness gain of the central region according to the theoretical brightness gain of at least part of the sub-display regions, and obtaining actual brightness gains of a plurality of first nodes in the non-central region according to the theoretical brightness gain of at least part of the sub-display regions; obtaining an actual brightness gain of at least part of the non-central region by using a bilinear interpolation method according to the actual brightness gains of the plurality of first nodes and an actual brightness gain of at least one second node on the central region; and compensating the picture to be displayed based on an actual brightness gain of the picture to be displayed.

20 Claims, 12 Drawing Sheets

(52) U.S. Cl.
CPC ............... *G09G 2320/0233* (2013.01); *G09G 2320/0626* (2013.01); *G09G 2330/021* (2013.01); *G09G 2360/16* (2013.01)

(56) References Cited

U.S. PATENT DOCUMENTS

| | | | | |
|---|---|---|---|---|
| 2010/0201716 | A1* | 8/2010 | Tanizoe | G09G 3/2007 345/690 |
| 2013/0057593 | A1* | 3/2013 | Morishita | G09G 3/3426 349/61 |
| 2014/0043380 | A1* | 2/2014 | Ichioka | H04N 5/66 345/77 |
| 2015/0123956 | A1* | 5/2015 | Kurita | G09G 3/3426 345/207 |
| 2020/0227006 | A1* | 7/2020 | Yao | G09G 3/006 |
| 2020/0379705 | A1 | 12/2020 | Chi et al. | |
| 2021/0134246 | A1* | 5/2021 | Li | G09G 3/3275 |
| 2021/0225325 | A1* | 7/2021 | Chu | G09G 3/2074 |
| 2022/0005426 | A1* | 1/2022 | Gao | G09G 3/3611 |
| 2022/0075589 | A1* | 3/2022 | Yu | G06F 3/1446 |

FOREIGN PATENT DOCUMENTS

| | | |
|---|---|---|
| CN | 106409206 A | 2/2017 |
| CN | 107221306 A | 9/2017 |
| CN | 108320714 A | 7/2018 |
| CN | 109920360 A | 6/2019 |
| CN | 111028809 A | 4/2020 |
| CN | 111326115 A | 6/2020 |
| CN | 112150956 A | 12/2020 |
| CN | 113160757 A | 7/2021 |
| DE | 102011077142 A | 12/2011 |
| EP | 3400589 B1 | 4/2021 |
| JP | 2015125243 A | 7/2015 |
| KR | 20140016558 A | 2/2014 |
| WO | 2012147651 A1 | 11/2012 |

* cited by examiner

SPLICED SCREEN AND METHOD FOR COMPENSATING DISPLAY OF THE SPLICED SCREEN

CROSS REFERENCE

The present disclosure is based upon International Application No. PCT/CN2021/143235, filed on Dec. 30, 2021, the entire contents of which are incorporated herein by reference.

TECHNICAL FIELD

The present disclosure relates to the field of display technology, and in particular, to a spliced screen and a method for compensating display of the spliced screen.

BACKGROUND

In the related art, the spliced screen cannot achieve a better display effect after brightness gain compensation.

It should be noted that the information disclosed in the above background part is only used to enhance the understanding of the background of the present disclosure, and therefore may include information that does not constitute the related art known to those of ordinary skill in the art.

SUMMARY

According to an aspect of the present disclosure, there is provided a method for compensating display of a spliced screen, the spliced screen includes a plurality of sub-display screens, where the method for compensating includes:
  obtaining a picture to be displayed, the picture to be displayed including at least one display unit region, the display unit region including a plurality of sub-display regions in one-to-one correspondence with the sub-display screens, a sub-display region being displayed on a sub-display screen corresponding to the sub-display region, and the display unit region further including a central region and a non-central region located around the central region;
  obtaining a theoretical brightness gain of at least one sub-display region in the plurality of sub-display regions;
  obtaining an actual brightness gain of the central region according to the theoretical brightness gain of at least part of the sub-display regions, and obtaining actual brightness gains of a plurality of first nodes in the non-central region according to the theoretical brightness gain of at least part of the sub-display regions;
  obtaining an actual brightness gain of at least part of the non-central region by using a bilinear interpolation method according to the actual brightness gains of the plurality of first nodes and an actual brightness gain of at least one second node on the central region;
  where the actual brightness gain of the central region is greater than or equal to the actual brightness gain of the non-central region; and
  compensating the picture to be displayed based on an actual brightness gain of the picture to be displayed to obtain an actually displayed picture.

In some embodiments of the present disclosure, obtaining the theoretical brightness gain of at least one sub-display region includes:
  obtaining total brightness information of the sub-display region displayed on the sub-display screen as Lt according to a gray scale value of each sub-pixel unit in the sub-display region;
  obtaining a maximum power consumption value of the sub-display screen as Lm;
  obtaining a brightness proportion value of the sub-display region as Lt/Lm; and
  obtaining the theoretical brightness gain of the sub-display region by using a preset database according to the brightness proportion value of the sub-display region, the database including a mapping relationship between the brightness proportion value of the sub-display region and the theoretical brightness gain of the sub-display region.

In some embodiments of the present disclosure, obtaining the total brightness information of the sub-display region displayed on the sub-display screen according to the gray scale value of each sub-pixel unit in the sub-display region includes:
  obtaining a brightness value of each sub-pixel unit in each pixel unit according to the gray scale value of each sub-pixel unit in each pixel unit on the sub-display region;
  obtaining brightness information of each sub-pixel unit in a corresponding pixel unit on the sub-display screen according to the brightness value of each sub-pixel unit in each pixel unit on the sub-display region; and
  obtaining the total brightness information of the sub-display region displayed on the sub-display screen by summing brightness information of all sub-pixel units on the sub-display screen.

In some embodiments of the present disclosure, obtaining the brightness value of each sub-pixel unit in each pixel unit according to the gray scale value of each sub-pixel unit in each pixel unit on the sub-display region includes:
  obtaining, in a same pixel unit, a brightness value of a R sub-pixel unit as Lr, a brightness value of a G sub-pixel unit as Lg, and a brightness value of a B sub-pixel unit as Lb, by using a formula $L=[GL/(2^i-1)]^{gam} \times (2^j-1)$; where, L represents a brightness value, GL represents a gray scale value, gam represents a gamma value, i and j are positive integers greater than or equal to 1; and
  when a pixel unit in the sub-display region includes an R sub-pixel unit, a G sub-pixel unit, and a B sub-pixel unit, and when a pixel unit in the sub-display screen includes an R sub-pixel unit, a G sub-pixel unit, a B sub-pixel unit, and a W sub-pixel unit, obtaining the brightness information of each sub-pixel unit in a corresponding pixel unit on the sub-display screen according to the brightness value of each sub-pixel unit in each pixel unit on the sub-display region includes:
  obtaining, in the corresponding pixel unit on the sub-display screen:
  brightness information of the W sub-pixel unit as L'w=Min (Lr, Lg, Lb);
  brightness information of the R sub-pixel unit as L'r=Lr−L'w;
  brightness information of the G sub-pixel unit as L'g=Lg−L'w; and
  brightness information of the B sub-pixel unit as L'b=Lb−L'w.

In some embodiments of the present disclosure, when a pixel unit in the sub-display region includes an R sub-pixel unit, a G sub-pixel unit and a B sub-pixel unit, and when a pixel unit in the sub-display screen includes an R sub-pixel unit, a G sub-pixel unit, a B sub-pixel unit and a W sub-pixel unit, obtaining the maximum power consumption value of the sub-display screen as Lm, includes:
  obtaining the maximum power consumption value of the sub-display screen by using a formula $Lm=K\times 2\times(2^j-1)$;
  where, Lm is the maximum power consumption value of the sub-display screen, and K is a number of pixel units on the sub-display screen.

In some embodiments of the present disclosure, in a same display unit region, the plurality of sub-display regions include a plurality of first sub-display regions, the central region overlaps with each first sub-display region, the non-central region overlaps with the plurality of first sub-display regions, and obtaining the actual brightness gain of the central region according to the theoretical brightness gain of at least part of the sub-display regions includes:
  obtaining a maximum theoretical brightness gain in the plurality of first sub-display regions according to a theoretical brightness gain of each first sub-display region; and
  taking a product of the maximum theoretical brightness gain and a first coefficient as the actual brightness gain of the central region, the first coefficient being greater than or equal to 1.

In some embodiments of the present disclosure, in a same display unit region, the plurality of sub-display regions include a plurality of first sub-display regions, the central region overlaps with each first sub-display region, and the non-central region overlaps with the plurality of sub-display regions; and
  obtaining the actual brightness gains of the plurality of first nodes in the non-central region according to the theoretical brightness gain of at least part of the sub-display regions, includes:
  obtaining the plurality of first nodes, the plurality of first nodes including a plurality of first sub-nodes and a plurality of second sub-nodes, the plurality of first sub-nodes being respectively located at each vertex of a first pattern, the second sub-nodes being located on side edges of the first pattern, and the plurality of first sub-display regions enclosing and forming the first pattern;
  obtaining a product of a theoretical brightness gain of a first sub-display region where a first sub-node is located and a second coefficient as an actual brightness gain of the first sub-node, the second coefficient being less than or equal to 1; and
  obtaining, according to actual brightness gains of two first sub-nodes, an actual brightness gain of a second sub-node located on a same side of the first pattern as the two first sub-nodes through a linear interpolation method.

In some embodiments of the present disclosure, in a same display unit region, the plurality of sub-display regions include a plurality of first sub-display regions, the central region overlaps with each first sub-display region, and the non-central region overlaps with the plurality of first sub-display regions;
  the plurality of first nodes include a plurality of first sub-nodes and a plurality of second sub-nodes, the plurality of first sub-nodes are respectively located at each vertex of a first pattern, the second sub-nodes are located side edges of the first pattern, and the plurality of first sub-display regions enclose and form the first pattern; and
  obtaining the actual brightness gain of at least part of the non-central region by using a bilinear interpolation method according to the actual brightness gains of the plurality of first nodes and the actual brightness gain of at least one second node on the central region, includes:
  obtaining the second node on the central region, the second node and the plurality of first nodes being respectively located at four vertices of a same interpolation rectangle and being located in a same first sub-display region; and
  obtaining an actual brightness gain of the non-central region in the interpolation rectangle by using actual brightness gains of the first nodes and the second node located at the four vertices of the same interpolation rectangle through the bilinear interpolation method.

In some embodiments of the present disclosure, the second node is located at an edge of the central region.

In some embodiments of the present disclosure, the first sub-display region is rectangular, the display unit region includes four first sub-display regions distributed in a two-by-two matrix, and the four first sub-display regions form the first pattern of a rectangular structure;
  the central region is rectangular, the central region partially overlaps with the four first sub-display regions respectively, and four side edges of the central region are respectively parallel to four side edges of the first pattern;
  in a same first sub-display region, a first sub-node includes a first sub-subnode; the second node includes a second sub-subnode, a third sub-subnode, and a fourth sub-subnode; the second sub-subnode is located on a vertex of the central region; the third sub-subnode and the fourth sub-subnode are located on intersection points between edges of the central region and edges of the first sub-display region; and the second sub-node includes a fifth sub-subnode, a sixth sub-subnode, a seventh sub-subnode, and an eighth sub-subnode;
  the first sub-subnode, the fifth sub-subnode, the second sub-subnode and the sixth sub-subnode form four vertices of an interpolation rectangle; the second sub-subnode, the third sub-subnode, the seventh sub-subnode and the fifth sub-subnode form four vertices of an interpolation rectangle; and the second sub-subnode, the sixth sub-subnode, the eighth sub-subnode and the fourth sub-subnode form four vertices of an interpolation rectangle.

In some embodiments of the present disclosure, in a same display unit region, the plurality of sub-display regions include a plurality of first sub-display regions, the central region overlaps with each first sub-display region, the non-central region overlaps with the plurality of first sub-display regions, the first sub-display region includes a splicing region and a non-splicing region located in the non-central region, and the splicing region includes side edges spliced with other first sub-display regions;
  an actual brightness gain of the splicing region is obtained by using a bilinear interpolation method according to the actual brightness gains of the plurality of first nodes and the actual brightness gain of at least one second node on the central region; and
  an actual brightness gain of the non-splicing region is equal to a product of a theoretical brightness gain of a first sub-display region where the non-splicing region is located and a second coefficient, and the second coefficient is less than or equal to 1.

In some embodiments of the present disclosure, in a same display unit region, the plurality of sub-display regions include a plurality of first sub-display regions, the central region overlaps with each first sub-display region, and the non-central region overlaps with the plurality of first sub-display regions;

in the same display unit region, the plurality of sub-display regions further include a plurality of second sub-display regions in one-to-one correspondence with the sub-display screens, a second sub-display region is displayed on the sub-display screen corresponding to the second sub-display region, and the second sub-display region is located in the non-central region; and the method for compensating further includes:

obtaining an actual brightness gain of the second sub-display region based on an actual brightness gain of the first sub-display region.

In some embodiments of the present disclosure, the plurality of first sub-display regions are rectangular, the display unit region includes four first sub-display regions distributed in a two-by-two matrix, and the four first sub-display regions form a first pattern of a rectangular structure;

the central region is rectangular, the central region partially overlaps with the four first sub-display regions respectively, and four side edges of the central region are respectively parallel to four side edges of the first pattern;

the first sub-display region includes a first side edge and a second side edge that are not intersected with the central region, and a first vertex where the first side edge is intersected with the second side edge;

a region formed by the second sub-display regions includes:

a first rectangular region, including a side edge spliced with the first side edge;

a second rectangular region, including a side edge spliced with the second side edge; and a third rectangular region, connected to the first rectangular region and the second rectangular region, and including a vertex spliced with the first vertex; and obtaining the actual brightness gain of the second sub-display region based on the actual brightness gain of the first sub-display region, includes:

obtaining an actual brightness gain of a node on the first side edge as an actual brightness gain of each node in the first rectangular region in a same column as the node on the first side edge;

obtaining an actual brightness gain of a node on the second side edge as an actual brightness gain of each node in the second rectangular region in a same row as the node on the second side; and obtaining an actual brightness gain of a first node as an actual brightness gain of the third rectangular region;

where an extension direction of the first side edge is a row direction, and an extension direction of the second side edge is a column direction.

In some embodiments of the present disclosure, the picture to be displayed includes a plurality of display unit regions, and each display unit region includes the central region and the non-central region located around the central region.

In some embodiments of the present disclosure, in a same display unit region, the plurality of sub-display regions include four rectangular first sub-display regions, and the four first sub-display regions are distributed in a two-by-two matrix structure;

the central region partially overlaps with each first sub-display region, and the non-central region partially overlaps with each first sub-display region; and obtaining the actual brightness gains of the plurality of first nodes in the non-central region according to the theoretical brightness gain of at least part of the sub-display regions, includes:

obtaining the plurality of first nodes, the plurality of first nodes including a plurality of first sub-nodes and a plurality of second sub-nodes, the plurality of first sub-nodes being respectively located at each vertex of a first pattern, the second sub-nodes being located on side edges of the first pattern, and the plurality of first sub-display regions enclosing and forming the first pattern;

obtaining a minimum theoretical brightness gain of the first sub-display regions with the first sub-nodes as vertices, and obtaining a product of the minimum theoretical brightness gain and a second coefficient as an actual brightness gain of a first sub-node, the second coefficient being less than or equal to 1; and obtaining, according to actual brightness gains of two first sub-nodes, an actual brightness gain of a second sub-node located on a same side of the first pattern as the two first sub-nodes through a linear interpolation method, in the same display unit region.

In some embodiments of the present disclosure, compensating the picture to be displayed based on the actual brightness gain of the picture to be displayed to obtain the actually displayed picture, includes:

taking a product of the brightness information of each sub-pixel unit on the sub-display screens and the actual brightness gain corresponding to the sub-pixel unit as actual brightness information of the sub-pixel unit; and obtaining an actual gray scale value of the sub-pixel unit according to the actual brightness information of the sub-pixel unit, the actual gray scale value of each sub-pixel unit on the sub-display screens forming the actually displayed picture.

According to an aspect of the present disclosure, there is provided a spliced screen, where the spliced screen includes:

a plurality of sub-display screens;

a system circuit, used for:

obtaining a picture to be displayed, the picture to be displayed including at least one display unit region, the display unit region including a plurality of sub-display regions in one-to-one correspondence with the sub-display screens, a sub-display region being displayed on a sub-display screen corresponding to the sub-display region, and the display unit region further including a central region and a non-central region located around the central region;

obtaining a theoretical brightness gain of at least one sub-display region in the plurality of sub-display regions;

obtaining an actual brightness gain of the central region according to the theoretical brightness gain of at least part of the sub-display regions, and obtaining actual brightness gains of a plurality of first nodes in the non-central region according to the theoretical brightness gain of at least part of the sub-display regions;

obtaining an actual brightness gain of at least part of the non-central region by using a bilinear interpolation method according to the actual brightness gains of the plurality of first nodes and an actual brightness gain of at least one second node on the central region;

where the actual brightness gain of the central region is greater than or equal to the actual brightness gain of the non-central region; and compensating the picture to be displayed based on an actual brightness gain of the picture to be displayed to obtain an actually displayed picture;

a plurality of source driving circuits, provided in one-to-one correspondence with the plurality of sub-display screens;

a plurality of gate driving circuits, provided in one-to-one correspondence with the plurality of sub-display screens; and a plurality of timing controllers, provided in one-to-one correspondence with the plurality of source driving circuits and connected to the system circuit, the timing controllers being used for driving the source driving circuits and the gate driving circuits to input driving signals to the sub-display screens based on the actually displayed picture.

In some embodiments of the present disclosure, obtaining the theoretical brightness gain of at least one sub-display region s includes:

obtaining total brightness information of the sub-display region displayed on the sub-display screen as Lt according to a gray scale value of each sub-pixel unit in the sub-display region;

obtaining a maximum power consumption value of the sub-display screen as Lm;

obtaining a brightness proportion value of the sub-display region as Lt/Lm; and obtaining the theoretical brightness gain of the sub-display region by using a preset database according to the brightness proportion value of the sub-display region, the database including a mapping relationship between the brightness proportion value of the sub-display region and the theoretical brightness gain of the sub-display region.

In some embodiments of the present disclosure, obtaining the total brightness information of the sub-display region displayed on the sub-display screen according to the gray scale value of each sub-pixel unit in the sub-display region includes:

obtaining a brightness value of each sub-pixel unit in each pixel unit according to the gray scale value of each sub-pixel unit in each pixel unit on the sub-display region;

obtaining brightness information of each sub-pixel unit in a corresponding pixel unit on the sub-display screens according to the brightness value of each sub-pixel unit in each pixel unit on the sub-display region; and obtaining the total brightness information of the sub-display region displayed on the sub-display screen by summing brightness information of all sub-pixel units on the sub-display screen.

In some embodiments of the present disclosure, obtaining the brightness value of each sub-pixel unit in each pixel unit according to the gray scale value of each sub-pixel unit in each pixel unit on the sub-display region includes:

obtaining, in a same pixel unit, a brightness value of a R sub-pixel unit as Lr, a brightness value of a G sub-pixel unit as Lg, and a brightness value of a B sub-pixel unit as Lb, by using a formula $L=[GL/(2^i-1)]^{gam} \times (2^j-1)$;

where, L represents a brightness value, GL represents a gray scale value, gam represents a gamma value, i and j are positive integers greater than or equal to 1; and when a pixel unit in the sub-display region includes an R sub-pixel unit, a G sub-pixel unit, and a B sub-pixel unit, and when a pixel unit in the sub-display screen includes an R sub-pixel unit, a G sub-pixel unit, a B sub-pixel unit, and a W sub-pixel unit, obtaining the brightness information of each sub-pixel unit in a corresponding pixel unit on the sub-display screen according to the brightness value of each sub-pixel unit in each pixel unit on the sub-display region includes:

obtaining, in the corresponding pixel unit on the sub-display screen:

brightness information of the W sub-pixel unit as L'w=Min (Lr, Lg, Lb);

brightness information of the R sub-pixel unit as L'r=Lr−L'w;

brightness information of the G sub-pixel unit as L'g=Lg−L'w; and brightness information of the B sub-pixel unit as L'b=Lb−L'w.

In some embodiments of the present disclosure, when a pixel unit in the sub-display regions includes an R sub-pixel unit, a G sub-pixel unit and a B sub-pixel unit, and when a pixel unit in the sub-display screens includes an R sub-pixel unit, a G sub-pixel unit, a B sub-pixel unit and a W sub-pixel unit, obtaining the maximum power consumption value of the sub-display screen as Lm, includes:

obtaining the maximum power consumption value of the sub-display screen by using a formula $Lm=K \times 2 \times (2^j-1)$;

where, Lm is the maximum power consumption value of the sub-display screen, and K is a number of pixel units on the sub-display screen.

In some embodiments of the present disclosure, in a same display unit region, the plurality of sub-display regions include a plurality of first sub-display regions, the central region overlaps with each first sub-display region, the non-central region overlaps with the plurality of first sub-display regions, and obtaining the actual brightness gain of the central region according to the theoretical brightness gain of at least part of the sub-display regions includes:

obtaining a maximum theoretical brightness gain in the plurality of first sub-display regions according to a theoretical brightness gain of each first sub-display region; and taking a product of the maximum theoretical brightness gain and a first coefficient as the actual brightness gain of the central region, the first coefficient being greater than or equal to 1.

In some embodiments of the present disclosure, in a same display unit region, the plurality of sub-display regions include a plurality of first sub-display regions, the central region overlaps with each first sub-display region, and the non-central region overlaps with the plurality of first sub-display regions; and obtaining the actual brightness gains of the plurality of first nodes in the non-central region according to the theoretical brightness gain of at least part of the sub-display regions, includes:

obtaining the plurality of first nodes, the plurality of first nodes including a plurality of first sub-nodes and a plurality of second sub-nodes, the plurality of first sub-nodes being respectively located at each vertex of a first pattern, the second sub-nodes being located on side edges of the first pattern, and the plurality of first sub-display regions enclosing and forming the first pattern;

obtaining a product of a theoretical brightness gain of a first sub-display region where a first sub-node is located and a second coefficient as an actual brightness gain of the first sub-node, the second coefficient being less than or equal to 1; and obtaining, according to actual brightness gains of two first sub-nodes, an actual brightness gain of a second sub-node located on a same side of the first pattern as the two first sub-nodes through a linear interpolation method.

In some embodiments of the present disclosure, in a same display unit region, the plurality of sub-display regions include a plurality of first sub-display regions, the central region overlaps with each first sub-display region, and the non-central region overlaps with the plurality of first sub-display regions;

the plurality of first nodes include a plurality of first sub-nodes and a plurality of second sub-nodes, the plurality of first sub-nodes are respectively located at each vertex of a first pattern, the second sub-nodes are located on side edges of the first pattern, and the plurality of first sub-display regions enclose and form the first pattern; and obtaining the actual brightness gain of at least part of the non-central region by using a bilinear interpolation method according to the actual brightness gains of the plurality of first nodes and the actual brightness gain of at least one second node on the central region, includes:

obtaining the second node on the central region, the second node and the plurality of first nodes being respectively located at four vertices of a same interpolation rectangle and being located in a same first sub-display region; and obtaining an actual brightness gain of the non-central region in the interpolation rectangle by using the actual brightness gains of the first nodes and the second node located at the four vertices of the same interpolation rectangle through the bilinear interpolation method.

In some embodiments of the present disclosure, the second node is located at an edge of the central region.

In some embodiments of the present disclosure, the first sub-display region is rectangular, the display unit region includes four first sub-display regions distributed in a two-by-two matrix, and the four first sub-display regions form the first pattern of a rectangular structure;

the central region is rectangular, the central region partially overlaps with the four first sub-display regions respectively, and four side edges of the central region are respectively parallel to four side edges of the first pattern;

in a same first sub-display region, a first sub-node includes a first sub-subnode; the second node includes a second sub-subnode, a third sub-subnode, and a fourth sub-subnode; the second sub-subnode is located at a vertex of the central region; the third sub-subnode and the fourth sub-subnode are located on intersection points between edges of the central region and edges of the first sub-display region; and the second sub-node includes a fifth sub-subnode, a sixth sub-subnode, a seventh sub-subnode, and an eighth sub-subnode;

the first sub-subnode, the fifth sub-subnode, the second sub-subnode and the sixth sub-subnode form four vertices of an interpolation rectangle; the second sub-subnode, the third sub-subnode, the seventh sub-subnode and the fifth sub-subnode form four vertices of an interpolation rectangle; and the second sub-subnode, the sixth sub-subnode, the eighth sub-subnode and the fourth sub-subnode form four vertices of an interpolation rectangle.

In some embodiments of the present disclosure, in a same display unit region, the plurality of sub-display regions include a plurality of first sub-display regions, the central region overlaps with each first sub-display region, the non-central region overlaps with the plurality of first sub-display regions, the first sub-display region includes a splicing region and a non-splicing region located in the non-central region, and the splicing region includes side edges spliced with other first sub-display regions;

an actual brightness gain of the splicing region is obtained by using a bilinear interpolation method according to the actual brightness gains of the plurality of first nodes and the actual brightness gain of at least one second node on the central region; and an actual brightness gain of the non-splicing region is equal to a product of a theoretical brightness gain of a first sub-display region where the non-splicing region is located and a second coefficient, and the second coefficient is less than or equal to 1.

In some embodiments of the present disclosure, in a same display unit region, the plurality of sub-display regions include a plurality of first sub-display regions, the central region overlaps with each first sub-display region, and the non-central region overlaps with the plurality of first sub-display regions;

in the same display unit region, the plurality of sub-display regions further include a plurality of second sub-display regions in one-to-one correspondence with the sub-display screens, a second sub-display region is displayed on the sub-display screen corresponding to the second sub-display region, and the second sub-display region is located in the non-central region; and the system circuit is further used for:

obtaining an actual brightness gain of the second sub-display region based on an actual brightness gain of the first sub-display region.

In some embodiments of the present disclosure, the plurality of first sub-display regions are rectangular, the display unit region includes four first sub-display regions distributed in a two-by-two matrix, and the four first sub-display regions form a rectangular first pattern;

the central region is rectangular, the central region partially overlaps with the four first sub-display regions respectively, and four side edges of the central region are respectively parallel to four side edges of the first pattern;

the first sub-display region includes a first side edge and a second side edge that are not intersected with the central region, and a first vertex where the first side edge is intersected with the second side edge;

a region formed by the second sub-display regions includes:

a first rectangular region, including a side edge spliced with the first side edge;

a second rectangular region, including a side edge spliced with the second side edge; and a third rectangular region, connected to the first rectangular region and the second rectangular region, and including a vertex spliced with the first vertex; and obtaining the actual brightness gains of the second sub-display region based on the actual brightness gain of the first sub-display region, includes:

obtaining an actual brightness gain of a node on the first side edge as an actual brightness gain of each node in the first rectangular region in a same column as the node on the first side edge;

obtaining an actual brightness gain of a node on the second side edge as an actual brightness gain of each node in the second rectangular region in a same row as the node on the second side; and obtaining an actual brightness gain of a first node as an actual brightness gain of the third rectangular region;

where an extension direction of the first side edge is a row direction, and an extension direction of the second side edge is a column direction.

In some embodiments of the present disclosure, the picture to be displayed includes a plurality of display unit regions, and each display unit region includes the central region and the non-central region located around the central region.

In some embodiments of the present disclosure, in a same display unit region, the plurality of sub-display regions include four rectangular first sub-display regions, and the four first sub-display regions are distributed in a two-by-two matrix structure;

the central region partially overlaps with each first sub-display region, and the non-central region partially overlaps with each first sub-display region; and obtaining the actual brightness gains of the plurality of first nodes in the non-central region according to the theoretical brightness gain of at least part of the sub-display regions, includes:

obtaining the plurality of first nodes, the plurality of first nodes including a plurality of first sub-nodes and a plurality of second sub-nodes, the plurality of first sub-nodes being respectively located at each vertex of a first pattern, the second sub-nodes being located on side edges of the first pattern, and the plurality of first sub-display regions enclosing and forming the first pattern;

obtaining a minimum theoretical brightness gain of the first sub-display regions with the first sub-nodes as vertices, and obtaining a product of the minimum theoretical brightness gain and a second coefficient as an actual brightness gain of a first sub-node, where the second coefficient is less than or equal to 1; and obtaining, according to actual brightness gains of two first sub-nodes, an actual brightness gain of a second sub-node located on a same side of the first pattern as the two first sub-nodes through a linear interpolation method, in the same display unit region.

In some embodiments of the present disclosure, compensating the picture to be displayed based on the actual brightness gain of the picture to be displayed to obtain the actually displayed picture includes:

taking a product of the brightness information of each sub-pixel unit on the sub-display screens and the actual brightness gain corresponding to the sub-pixel unit as actual brightness information of the sub-pixel unit; and obtaining an actual gray scale value of the sub-pixel unit according to the actual brightness information of the sub-pixel unit, the actual gray scale value of each sub-pixel unit on the sub-display screens forming the actually displayed picture.

It should be understood that the above general description and the following detailed description are exemplary and explanatory only, and are not intended to limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
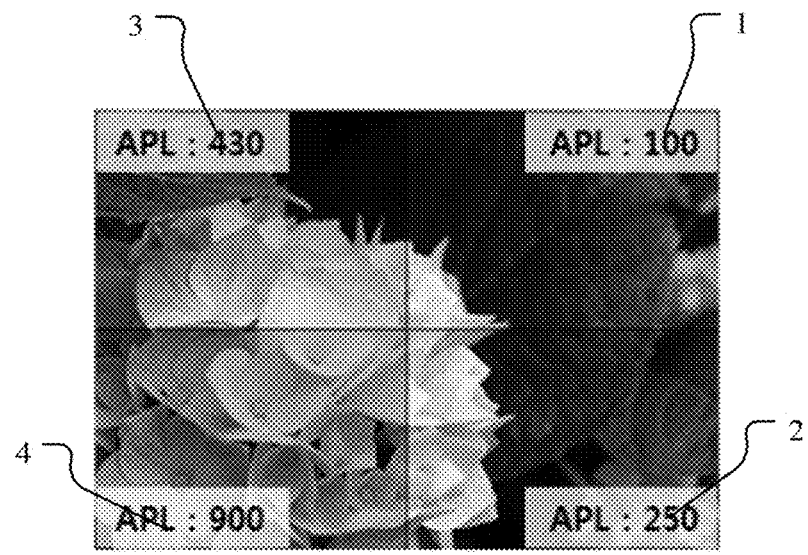
FIG. 1 and FIG. 2 are state diagrams that a two-by-two spliced screen displays different pictures when directly spliced.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

The terms "a," "an," "the," and "said" are used to mean that there are one or more elements/components/the like; the terms "comprising" and "including" are used to indicate the meaning of open inclusion and to indicate that there may be other elements/components/the like in addition to the listed elements/components/the like.

Electroluminescent elements are increasingly applied to display panels as a current-type light-emitting device. Since the electroluminescent display panel has self-luminous characteristics, the electroluminescent display panel does not need a backlight source, and has the advantages of high contrast, thin thickness, wide viewing angle, fast response speed, bendability, simple structure and manufacturing process, etc. Therefore, the electroluminescent display panel gradually becomes a next-generation main current display panel. In general, a pixel circuit includes a display unit (for example, a liquid crystal display (LCD), an organic light emitting diode (OLED) or other display units), a thin film transistor (TFT), and a storage capacitance. The voltage corresponding to the display data is charged to the capacitance through a fixed scanning wave type switch TFT, and the display unit is controlled through the magnitude of the voltage, so as to adjust the lighting brightness of the display unit.

Figure 2:
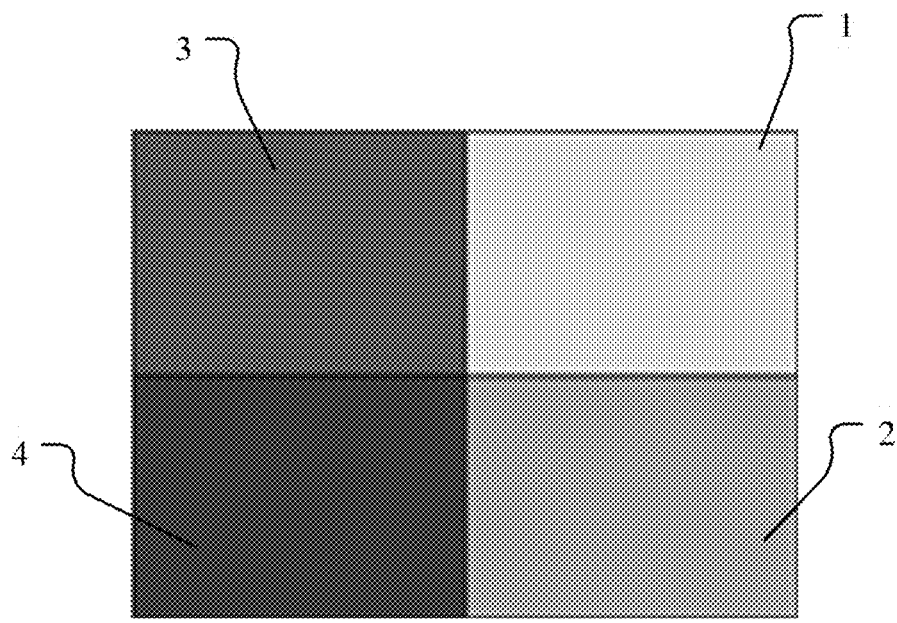

In the related art, in order to be compatible with the power consumption and display quality of the product, the brightness gain of each frame is usually obtained by using a peak brightness algorithm, and the brightness of the picture to be displayed is adjusted through the brightness gain, so that the display contrast of the display panel is improved under the condition that the power consumption is not increased. However, in the spliced screen, due to the fact that the brightness gain of the picture on each sub-display screen is different, it will result in an obvious splicing boundary in the splicing seam region of the spliced screen to perform stacking and splicing directly. For example, as shown in FIG. 1 and FIG. 2, FIG. 1 and FIG. 2 are state diagrams that a two-by-two spliced screen displays different pictures when directly spliced. Among them, FIG. 1 is a display state diagram that the spliced screen displays a picture, and FIG. 2 is a display state diagram that the spliced screen displays the same gray scale. As shown in FIG. 1 and FIG. 2, due to the fact that the brightness gains corresponding to the sub-display screen 1, the sub-display screen 2, the sub-display screen 3 and the sub-display screen 4 are sequentially reduced, it results in an obvious splicing boundary in the splicing seam region of the spliced screen, that is, there is an obvious brightness difference in the splicing seam region of the spliced screen.

In the related art, there are usually two methods for solving the splicing boundary.

Figure 3:
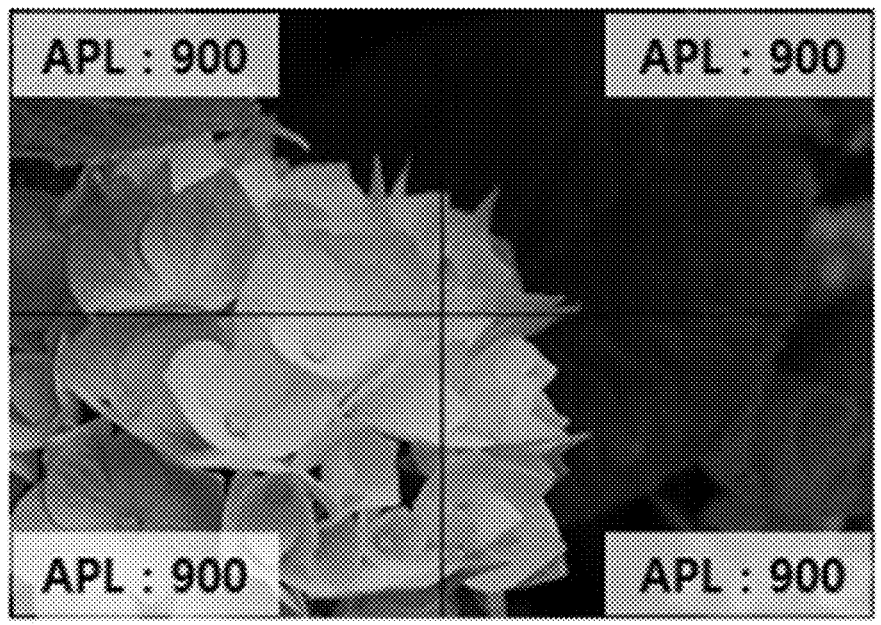
FIG. 3 and FIG. 4 are state diagrams that a two-by-two spliced screen displays different pictures by using a first method.
Figure 4:

The first method includes: obtaining the brightness gain of the corresponding picture on each sub-display screen in the spliced screen, and setting the minimum brightness gain in the brightness gain corresponding to each sub-display screen as the brightness gain of the picture on each sub-display screen. As shown in FIG. 3 and FIG. 4, FIG. 3 and FIG. 4 are state diagrams that a two-by-two spliced screen displays different pictures by using the first method. Among them, the display state diagram shown in FIG. 3 and the state diagram shown in FIG. 1 are the display state diagrams that the same spliced screen displays the same picture, and the display state diagram shown in FIG. 4 and the state diagram shown in FIG. 2 are the display state diagrams that the same spliced screen displays the same picture. According to FIG. 3 and FIG. 4, it can be seen that although the first method solves the problem that there is a splicing boundary in the splicing seam region of the spliced screen, the first method can cause reduction of the brightness and resolution of the display picture.

Figure 5:
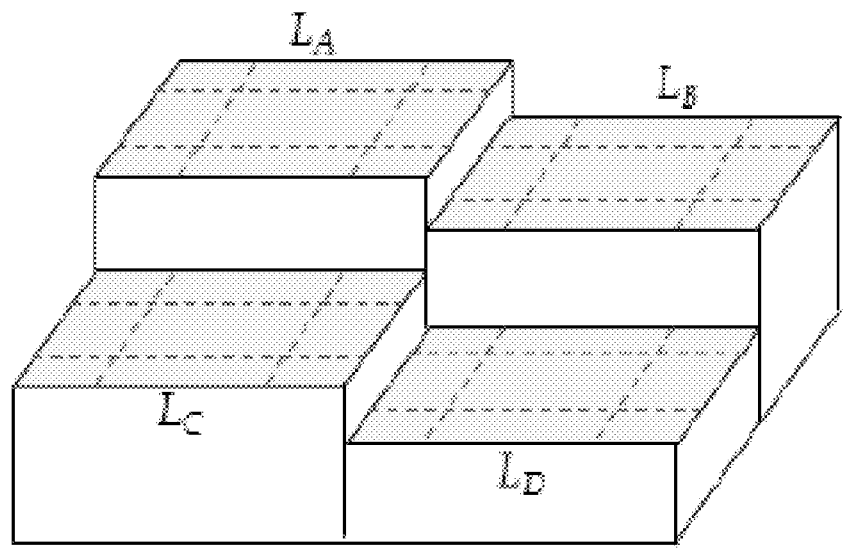
FIG. 5 is a schematic diagram of a peak brightness of each sub-display screen on a two-by-two spliced screen.
Figure 6:
FIG. 6 is a display state diagram that the spliced screen shown in FIG. 5 displays a picture.
Figure 7:
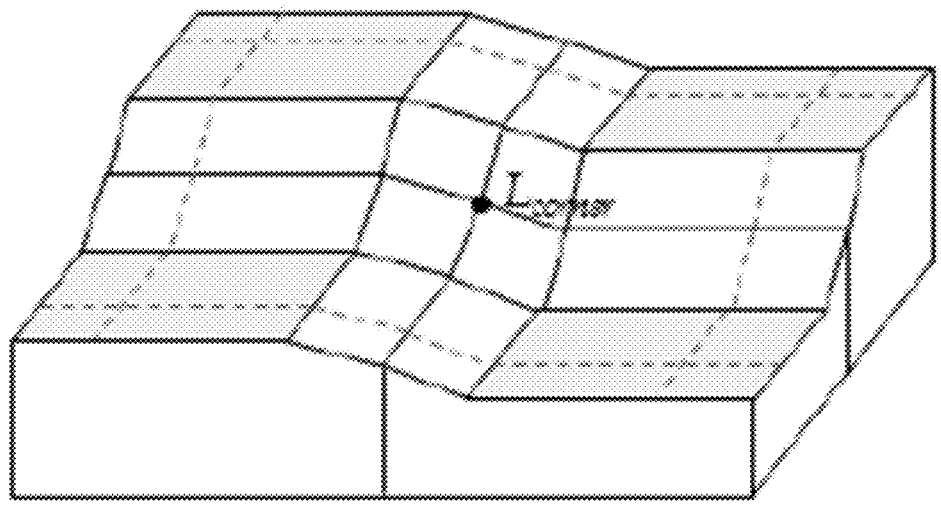
FIG. 7 is a schematic diagram of a peak brightness of each sub-display screen on a two-by-two spliced screen.
Figure 8:
FIG. 8 is a display state diagram that the spliced screen in FIG. 7 displays a picture.

The second method includes: obtaining the peak brightness value of each sub-display screen in the spliced screen, and transforming the change of the brightness at the intersection position of the sub-display screens into a gradual change in space by using a linear interpolation method, thereby reducing the brightness difference of the splicing region. As shown in FIG. 5 and FIG. 6, FIG. 5 is a schematic diagram of a peak brightness of each sub-display screen on a two-by-two spliced screen, and FIG. 6 is a display state diagram that the spliced screen shown in FIG. 5 displays a picture. As shown in FIG. 5, the peak brightness of different sub-display screens is LA, LB, LC, LD, respectively; the peak brightness of different sub-display screens on the spliced screen has different values; and correspondingly, there is an obvious brightness boundary at the splicing region of the picture shown in FIG. 6. As shown in FIG. 7 and FIG. 8, FIG. 7 is a schematic diagram of a peak brightness of each sub-display screen on a two-by-two spliced screen, and FIG. 8 is a display state diagram that the spliced screen in FIG. 7 displays a picture. In the spliced screen in FIG. 7, the change of the brightness at the intersection position of the sub-display screens is transformed into a gradual change in space by using a linear interpolation method, so that the brightness at the splicing boundary of the picture shown in FIG. 8 transitions smoothly.

However, although the second method solves the problem of presence of splicing boundary in the splicing seam region of the spliced screen and low display brightness, in the second method, the highest brightness position of the displayed picture is not in the central position of the picture, resulting in a poorer display effect.

Figure 9:
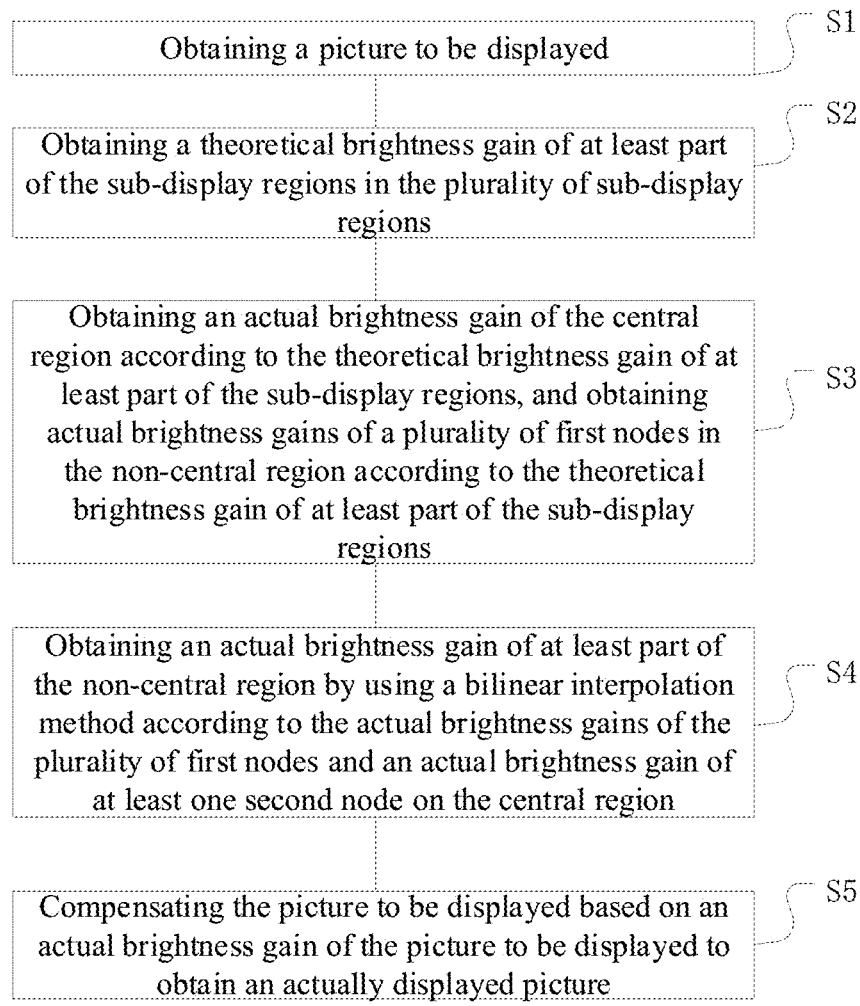
FIG. 9 is a flowchart of a method for compensating display of a spliced screen according to some embodiments of the present disclosure.

Based on this, the present exemplary embodiment provides a method for compensating display of the spliced screen, the spliced screen may include a plurality of sub-display screens. Among them, as shown in FIG. 9, it is a flowchart a method for compensating display of the spliced screen according to some embodiments of the present disclosure, and the method for compensating may include the following steps.

In step S1, a picture to be displayed is obtained, where the picture to be displayed includes at least one display unit region, the display unit region includes a plurality of sub-display regions in one-to-one correspondence with the sub-display screens, the sub-display region is displayed on a sub-display screen corresponding to the sub-display region, and the display unit region further includes a central region and a non-central region located around the central region;

In step S2, a theoretical brightness gains of at least part of the sub-display regions in the plurality of sub-display regions is obtained;

In step S3, an actual brightness gain of the central region is obtained according to the theoretical brightness gain of at least part of the sub-display regions, and actual brightness gains of a plurality of first nodes in the non-central region are obtained according the theoretical brightness gain of at least part of the sub-display regions;

In step S4, an actual brightness gain of at least part of the non-central region is obtained by using a bilinear interpolation method according to the actual brightness gains of the plurality of first nodes and an actual brightness gain of at least one second node on the central region;

Where, the actual brightness gain of the central region is greater than or equal to the actual brightness gain of the non-central region;

In step S5, the picture to be displayed is compensated based on an actual brightness gain of the picture to be displayed to obtain an actually displayed picture.

In the method for compensating display of the spliced screen, the display unit region is divided into a central region and a non-central region, where the actual brightness gain of the central region is greater than or equal to the actual brightness gain of the non-central region, and this setting can achieve a better display effect. In addition, in the method for compensating display of the spliced screen, a bilinear interpolation method is used to obtain the actual brightness gain of at least part of the non-central region, so that the brightness of the central region and the brightness of the non-central region can transition smoothly.

In the following present exemplary embodiment, by taking a two-by-two spliced screen as an example, the above steps are described in detail.

Figure 10:
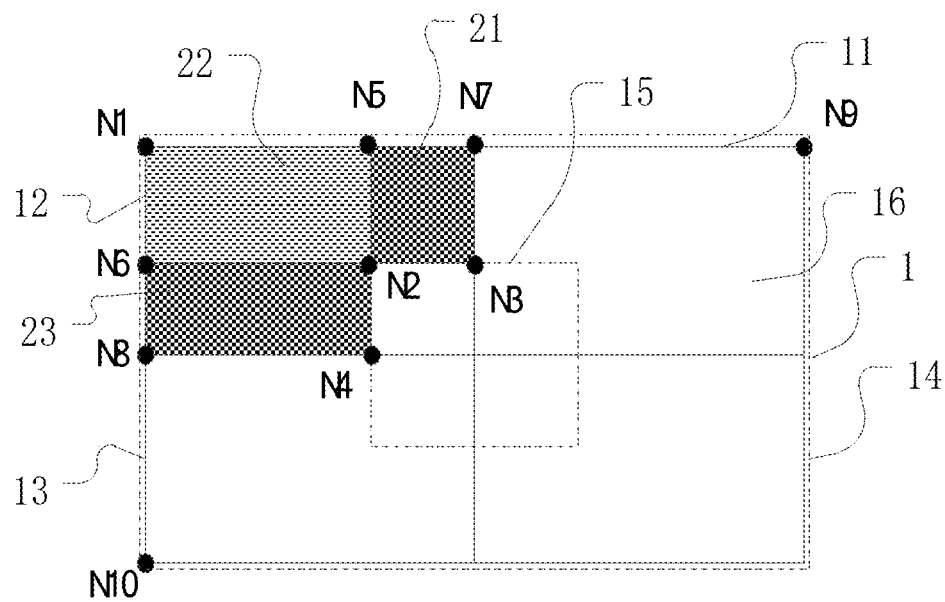
FIG. 10 is a state diagram that a spliced screen displays a picture to be displayed according to some embodiments of the present disclosure.

In Step S1, a picture to be displayed is obtained. As shown in FIG. 10, it is a state diagram that a spliced screen displays a picture to be displayed according to some embodiments of the present disclosure. The picture to be displayed may include a display unit region 1, the display unit region 1 may include four sub-display regions of sub-display region 11, sub-display region 12, sub-display region 13, and sub-display region 14, in one-to-one correspondence with the sub-display screens; and the sub-display region is displayed on the corresponding sub-display screen. The display unit region 1 may further include a central region 15 and a non-central region 16 located around the central region 15, where the non-central region 16 may be all regions except for the central region 15 in the display unit region. Among them, the central region 15 may overlap with each sub-display region, and the non-central region 16 may overlap with each sub-display region. The four sub-display regions may be rectangles of the same shape and size, the central region 15 may also be rectangular, and four side edges of the central region 15 may be parallel to four side edges of any sub-display region, respectively.

Figure 11:
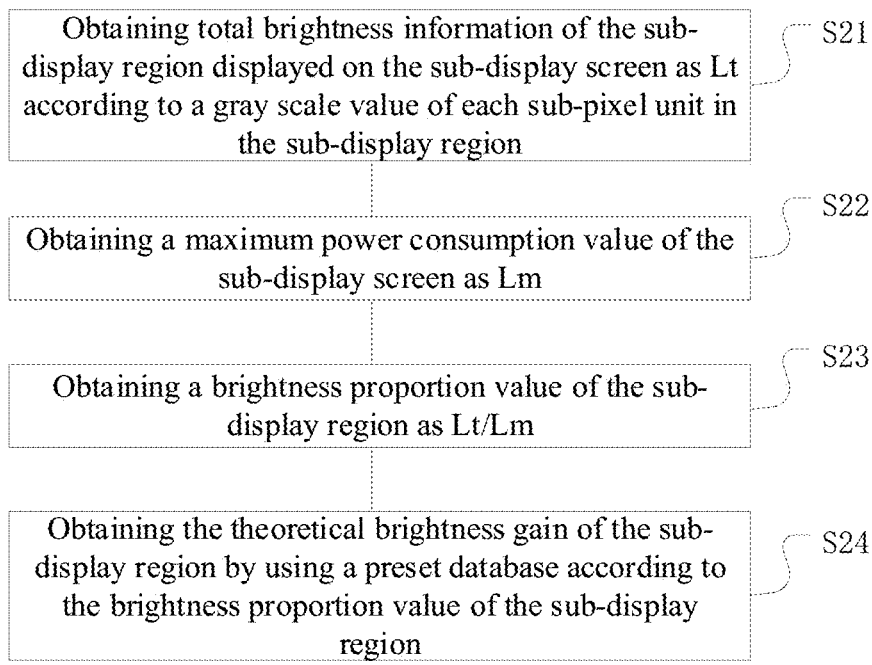
FIG. 11 is a flowchart of a method for obtaining brightness gain in the method for compensating display of a spliced screen according to some embodiments of the present disclosure.

In step S2, a theoretical brightness gain of at least part of the sub-display regions in the plurality of sub-display regions is obtained. As shown in FIG. 11, step S2 may include: obtaining theoretical brightness gains of the sub-display region 11, the sub-display region 12, the sub-display region 13, and the sub-display region 14. As shown in FIG. 11, it is a flowchart of a method for obtaining brightness gain in the method for compensating display of the spliced screen according to some embodiments of the present disclosure. Obtaining the theoretical brightness gain of a sub-display region may include the following steps.

In step S21, total brightness information of the sub-display region displayed on the sub-display region is obtained as Lt, according to a gray scale value of each sub-pixel unit in the sub-display region;

In step S22, a maximum power consumption value of the sub-display screen is obtained as Lm;

In step S23, a brightness proportion value of the sub-display region is obtained as Lt/Lm;

In step S24, the theoretical brightness gain of the sub-display region is obtained by using a preset database according to the brightness proportion value of the sub-display region, where the database includes a mapping relationship between the brightness proportion value of the sub-display region and the theoretical brightness gain of the sub-display region.

Figure 12:
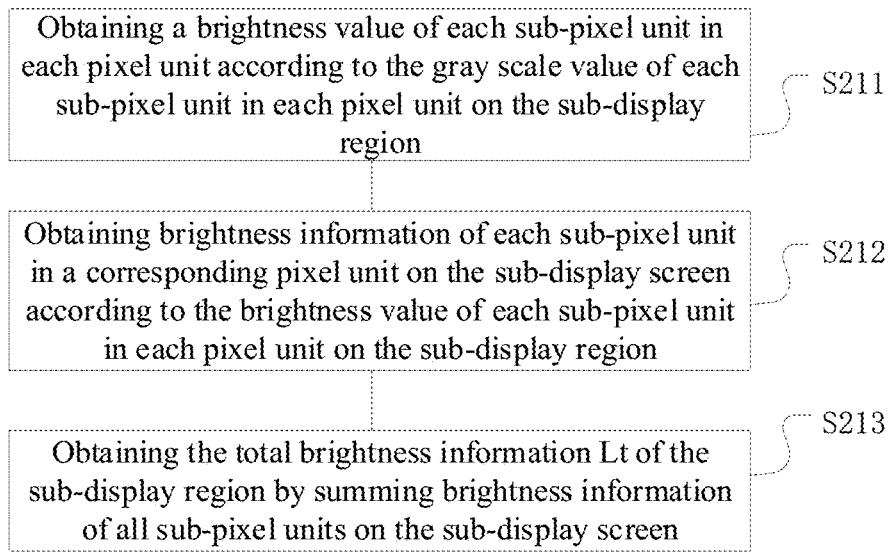
FIG. 12 is a flowchart of obtaining total brightness information of a sub-display region displayed on a sub-display screen in the method for compensating display of a spliced screen according to some embodiments of the present disclosure.

Among them, as shown in FIG. 12, it is a flowchart of obtaining total brightness information of a sub-display region displayed on a sub-display screen in the method for compensating display of the spliced screen according to some embodiments of the present disclosure. Obtaining the total brightness information of the sub-display region displayed on the sub-display screen according to the gray scale value of each sub-pixel unit in the sub-display region may include the following steps.

In step S211, a brightness value of each sub-pixel unit in each pixel unit is obtained according to the gray scale value of each sub-pixel unit in each pixel unit on the sub-display region. In the present exemplary embodiment, in a same pixel unit, the brightness value of the R sub-pixel unit can be obtained as Lr, the brightness value of the G sub-pixel unit can be obtained as Lg, and the brightness value of the B sub-pixel unit can be obtained as Lb, by using the formula $L=[GL/(2^i-1)]^{gam} \times (2^j-1)$; where L represents the brightness value, GL represents the gray scale value, gam represents the gamma value, and i and j are positive integers greater than or equal to 1. The gamma value may be 2.2. $2^i-1$ is the maximum gray scale value after gray scale homogenization. For example, in an 8 bit display panel, i may be equal to 8, and the maximum gray scale value of the display panel is 255. $2^j-1$ is the maximum brightness value after brightness homogenization.

In step S212, after the brightness value of each sub-pixel in each pixel unit is obtained, brightness information of each sub-pixel unit in a corresponding pixel unit on the sub-display screen may be obtained according to the brightness value of each sub-pixel unit in each pixel unit on the sub-display region. For example, when the pixel unit in the sub-display region includes an R sub-pixel unit, a G sub-pixel unit and a B sub-pixel unit, and when the pixel unit in the sub-display screen includes an R sub-pixel unit, a G sub-pixel unit, a B sub-pixel unit and a W sub-pixel unit, obtaining the brightness information of each sub-pixel unit in the corresponding pixel unit on the sub-display screen according to the brightness value of each sub-pixel unit in each pixel unit on the sub-display region may include:

obtaining, in the corresponding pixel unit on the sub-display screen:
brightness information of the W sub-pixel unit as L'w=Min (Lr, Lg, Lb);
brightness information of the R sub-pixel unit as L'r=Lr−L'w;
brightness information of the G sub-pixel unit as L'g=Lg−L'w; and
brightness information of the B sub-pixel unit as L'b=Lb−L'w.

Among them, the pixel units in the sub-display region are displayed by corresponding pixel units in the sub-display screen. The above mentioned Lr, Lg and Lb are brightness values of each sub-pixel unit in the same pixel unit on the sub-display region, L'w, L'r, L'g, and L'b are brightness information of each sub-pixel unit in the corresponding pixel unit on the sub-display screen.

In step S213, the total brightness information Lt of the sub-display region is to obtained by summing the brightness information of all the sub-pixel units on the sub-display screen, that is, the total brightness information Lt is the sum of the brightness information of all the sub-pixel units on the sub-display screen.

In step S22, the maximum power consumption value of the sub-display screen is obtained as Lm, and step S22 may include:

obtaining the maximum power consumption value of the sub-display screen by using a formula $Lm=K \times 2 \times (2^j-1)$, where Lm is the maximum power consumption value of the sub-display screen, and K is a number of pixel units on the sub-display screen. The maximum power consumption value is the maximum total brightness information of the sub-display screen. According to the method for calculating the brightness information of the sub-pixel unit in the sub-display region, it can be seen that, when two sub-pixel units in the pixel unit on the sub-display region display the maximum gray scale, the brightness information of the corresponding pixel unit on sub-display screen is maximum, and the maximum brightness information of the corresponding pixel unit is $2 \times (2^j-1)$, therefore, the maximum power consumption value of the sub-display screen is $K \times 2 \times (2^j-1)$.

In step S24, the theoretical brightness gain of the sub-display region is obtained by using a preset database according to the brightness proportion value of the sub-display region, where the database includes a mapping relationship between the brightness proportion value of the sub-display region and the theoretical brightness gain of the sub-display region. The database may comprise a data type such as a lookup table and a relationship curve. In the present exemplary embodiment, the obtaining method of the database may include the following.

Figure 13:
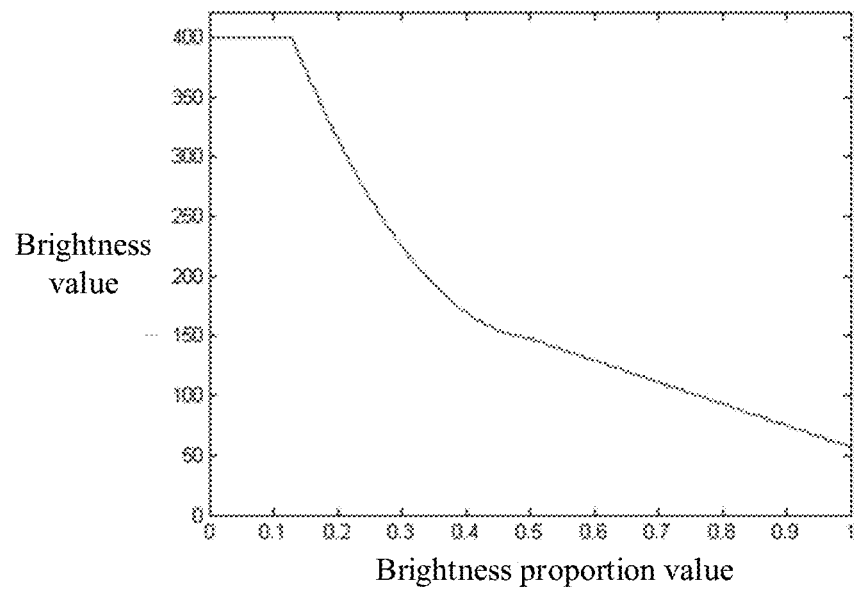
FIG. 13 is a curve graph of a relationship between a brightness proportion value and a brightness value in a sub-display screen.

Firstly, the peak brightness value, the general brightness value and the mixed color brightness value of the sub-display screen are obtained, where the peak brightness value is the maximum brightness value of the sub-display screen; the general brightness value is the brightness value of the sub-display screen for displaying a white picture; and the mixed color brightness value is the brightness value of the sub-display screen at the maximum power consumption. The peak brightness value, the general brightness value, and the mixed color brightness value may be obtained by means of actual measurement. Then, according to the peak brightness value, the general brightness value, the mixed color brightness value, and the brightness proportion values respectively corresponding to the peak brightness value, the general brightness value and the mixed color brightness value, the curve graph of the relationship between the brightness proportion value and the brightness value in the sub-display screen is obtained through an interpolation method. For example, as shown in FIG. 13, it is a curve graph of a relationship between the brightness proportion value and the brightness value in the sub-display screen. Among them, the abscissa is the brightness proportion value, and the ordinate is the brightness value. As shown in FIG. 13, the peak brightness value L1 of the sub-display screen may be 400 Nits, the general brightness value L2 may be 150 Nits, and the mixed color brightness value L3 may be 55 Nits. Among them, the brightness proportion value corresponding to the mixed color brightness value is 1, the brightness proportion value corresponding to the general brightness value is 0.5, and the brightness proportion value corresponding to the peak brightness value is $L2 \times 0.5/L1 = 0.1875$. Among them, the brightness value of the region between the peak brightness value and the general brightness value can be obtained based on the peak brightness value, the general brightness value, and the brightness proportion values respectively corresponding to the peak brightness value and the general brightness values by using an exponential interpolation method, and the exponential interpolation method can ensure a balance between the brightness value and the power consumption; the brightness value between the general brightness value and the mixed color brightness value can be obtained based on the general brightness value, the mixed color brightness value and the brightness proportion values respectively corresponding to the general brightness value and the mixed color brightness value by using a linear interpolation method, and the linear interpolation method can ensure that the brightness value does not change significantly when the picture changes. After the relationship curve shown in FIG. 13 is obtained, the proportion of the brightness value corresponding to the brightness proportion value to the peak brightness value corresponding to the brightness proportion value is the theoretical brightness gain corresponding to the brightness proportion value. For example, the brightness proportion value is 0.5, and the theoretical brightness gain corresponding to the brightness proportion value is 150/400.

It should be understood that, in other embodiments, the sub-display screen may also be other pixel structures, such as RGB, GGGB, and the like. In addition, the theoretical brightness gain of the sub-display region may also be obtained through other methods.

In step S3, an actual brightness gain of the central region is obtained according to the theoretical brightness gain of at least part of the sub-display regions, and actual brightness gains of a plurality of first nodes in the non-central region is obtained according to the theoretical brightness gain of at least part of the sub-display regions.

In the present exemplary embodiment, as shown in FIG. 10, obtaining the actual brightness gain of the central region according to the theoretical brightness gain of at least part of the sub-display regions may include: obtaining the maximum theoretical brightness gain in the sub-display region 11, the sub-display region 12, the sub-display region 13, and the sub-display region 14; and, taking the product of the maximum theoretical brightness gain and a first coefficient as the actual brightness gain of the central region 15, where the first coefficient may be greater than or equal to 1. In the embodiment, the brightness of the central region can be can increased by multiplying the maximum theoretical brightness gain by the first coefficient.

In the present exemplary embodiment, obtaining the actual brightness gains of the plurality of first nodes in the non-central region according to the theoretical brightness gain of at least part of the sub-display regions may include the following.

Firstly, a plurality of the first nodes in the non-central region are obtained. The plurality of first nodes may include a plurality of first sub-nodes and a plurality of second sub-nodes; the plurality of first sub-nodes are respectively located at each vertex of a first pattern; the second sub-nodes are located on side edges of the first pattern; and, the sub-display region 11, the sub-display region 12, the sub-display region 13 and the sub-display region 14 enclose and form the first pattern.

Secondly, the product of the theoretical brightness gain of the sub-display region where the first sub-node is located and a second coefficient is obtained as the actual brightness gain of the first sub-node, and the second coefficient is less than or equal to 1. As shown in FIG. 10, and the first sub-nodes may include: a first sub-subnode N1, a ninth sub-subnode N9, and a tenth sub-subnode N10, and the second sub-node may include a fifth sub-subnode N5, a sixth sub-subnode N6, a seventh sub-subnode N7, and an eighth sub-subnode N8. Among them, the actual brightness gain of the first sub-subnode N1 may be the product of the theoretical brightness gain of the sub-display region 12 and the second coefficient, the actual brightness gain of the ninth sub-subnode N9 may be the product of the theoretical brightness gain of the sub-display region 11 and the second coefficient, and the actual brightness gain of the tenth sub-subnode N10 may be the product of the theoretical brightness gain of the sub-display region 13 and the second coefficient. Among them, when the first coefficient is 1, the second coefficient may also be 1, and when the first coefficient is greater than 1, the second coefficient may be less than 1. The setting of the second coefficient can ensure that the overall power consumption of the spliced screen does not exceed the maximum power consumption. The actual brightness gains of the fifth sub-subnode N5 and the seventh sub-subnode N7 may be obtained by linear interpolation based on the actual brightness gain of the first sub-subnode N1 and the actual brightness gain of the ninth sub-subnode N9. The actual brightness gains of the sixth sub-subnode N6 and the eighth sub-subnode N8 may be obtained by linear interpolation based on the actual brightness gain of the first sub-subnode N1 and the actual brightness gain of the tenth sub-subnode N10.

It should be understood that in other exemplary embodiments, there may be other methods to obtain the actual brightness gain of the central region 15 according to the theoretical brightness gain of at least part of the sub-display regions. For example, obtaining the actual brightness gain of the central region according to the theoretical brightness gain of at least part of the sub-display regions may further include: obtaining a product of a theoretical brightness value of any sub-display region of the sub-display region 11, the sub-display region 12, the sub-display region 13 and the sub-display region 14 and the first coefficient as the actual brightness gain of the central region. Correspondingly, when the theoretical brightness gain of the sub-display region is less than or equal to the actual brightness gain of the central region, the actual brightness value of the first sub-node in the sub-display region is the product of the theoretical brightness value of the sub-display region where the first sub-node is located and the second coefficient; and when the theoretical brightness gain of the sub-display region is greater than the actual brightness gain of the central region, the actual brightness value of the first sub-node in the sub-display region is the actual brightness gain of the central region. For another example, obtaining the actual brightness gain of the central region according to the theoretical brightness gain of at least part of the sub-display regions may further include: obtaining the product of the average value of four theoretical brightness gains corresponding to the sub-display region 11, the sub-display region 12, the sub-display region 13, and the sub-display region 14 and the first coefficient as the actual brightness gain of the central region. Correspondingly, when the theoretical brightness gain of the sub-display region is less than or equal to the actual brightness gain of the central region, the actual brightness value of the first sub-node in the sub-display region is the product of the theoretical brightness gain of the sub-display region where the first sub-node is located and the second coefficient; and when the theoretical brightness gain of the sub-display region is greater than the actual brightness gain of the central region, the actual brightness value of the first sub-node in the sub-display region is the actual brightness gain of the central region.

In step S4, an actual brightness gain of at least part of the non-central region is obtained by using a bilinear interpolation method according to the actual brightness gains of the plurality of first nodes and the actual brightness gain of at least one second node on the central region. In the present exemplary embodiment, step S4 may include the following.

Firstly, the second node on the central region is obtained. The second node and the plurality of first nodes are respectively located at four vertices of the same interpolation rectangle and located in the same sub-display region. In addition, the second node may also be located at the edge of the central region 15. For example, as shown in FIG. 10, the plurality of second nodes may include a second sub-subnode N2, a third sub-subnode N3, and a fourth sub-subnode N4; the second sub-subnode N2 is located on the vertex of the central region 15, and the third sub-subnode N3 and the fourth sub-subnode N4 are respectively located on intersection points between edges of the central region 15 and edges of the sub-display region 12. The actual brightness gain of the second node is the actual brightness gain of the central region. The first sub-subnode N1, the fifth sub-subnode N5, the second sub-subnode N2, and the sixth sub-subnode N6 form four vertices of the interpolation rectangle 22; the second sub-subnode N2, the third sub-subnode N3, the seventh sub-subnode N7, and the fifth sub-subnode N5 form four vertices of the interpolation rectangle 21; and, the second sub-subnode N2, the sixth sub-subnode N6, the eighth sub-subnode N8, and the fourth sub-subnode N4 form four vertices of the interpolation rectangle 23. The actual brightness gain of the non-central region in the interpolation rectangle may be obtained by a bilinear interpolation method using the actual brightness gains of the four vertices located in the same interpolation rectangle.

In the present exemplary embodiment, as shown in FIG. 10, the actual brightness gain of the non-central region in the sub-display region 12 may be obtained by obtaining the actual brightness gains of the three interpolation rectangles. Similarly, the actual brightness gain of the non-central region in the sub-display region 11, the sub-display region 13, and the sub-display region 14 may also be obtained by using the foregoing method.

It should be noted that, in the present exemplary embodiment, one node includes one pixel unit, that is, the pixel unit is the minimum node in the interpolation method. It should be understood that in other exemplary embodiments, one node may further include a plurality of pixel units, that is, in the embodiment, interpolation may be performed by taking a plurality of pixel units as nodes, and correspondingly, the interpolation values obtained for the plurality of pixel units in the same node are the same.

In step S5, the picture to be displayed is compensated based on the actual brightness gain of the picture to be displayed to obtain an actually displayed picture. Step S5 may include the following.

Firstly, the compensated brightness value of each sub-pixel unit is obtained by multiplying the brightness information of each sub-pixel unit in the sub-display screen by the actual brightness gain corresponding to the sub-pixel unit, and then, the gray scale value of each sub-pixel unit is obtained by using the formula:

$$GL = L/(2^j-1))^{1/gam} \times (2^i - 1),$$

where L represents the brightness value, GL represents a gray scale value, gam represents a gamma value, i and j are positive integers greater than or equal to 1.

Figure 14:
FIG. 14 is a schematic diagram of a picture to be displayed.
Figure 15:
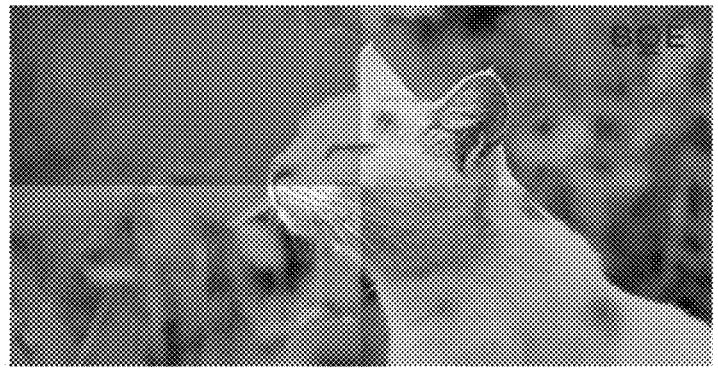
FIG. 15 is a display state diagram that the spliced screen being directly spliced displays the picture to be displayed shown in FIG. 14.
Figure 16:
FIG. 16 is a display state diagram that the spliced screen displays the picture to be displayed shown in FIG. 14 after using the method for compensating of the present disclosure.

As shown in FIG. 14, FIG. 15 and FIG. 16, FIG. 14 is a schematic diagram of a picture to be displayed, FIG. 15 is a display state diagram that the spliced screen being directly spliced displays the picture to be displayed shown in FIG. 14, and FIG. 16 is a display state diagram of displaying the picture to be displayed shown in FIG. 14 after using the method for compensating of the present disclosure. It can be seen from FIG. 14, FIG. 15 and FIG. 16 that, according to the method for compensating display provided in the present exemplary embodiment, not only the brightest display effect of the central region can be achieved, but also the splicing boundary in the splicing seam region can be avoided.

Figure 17:
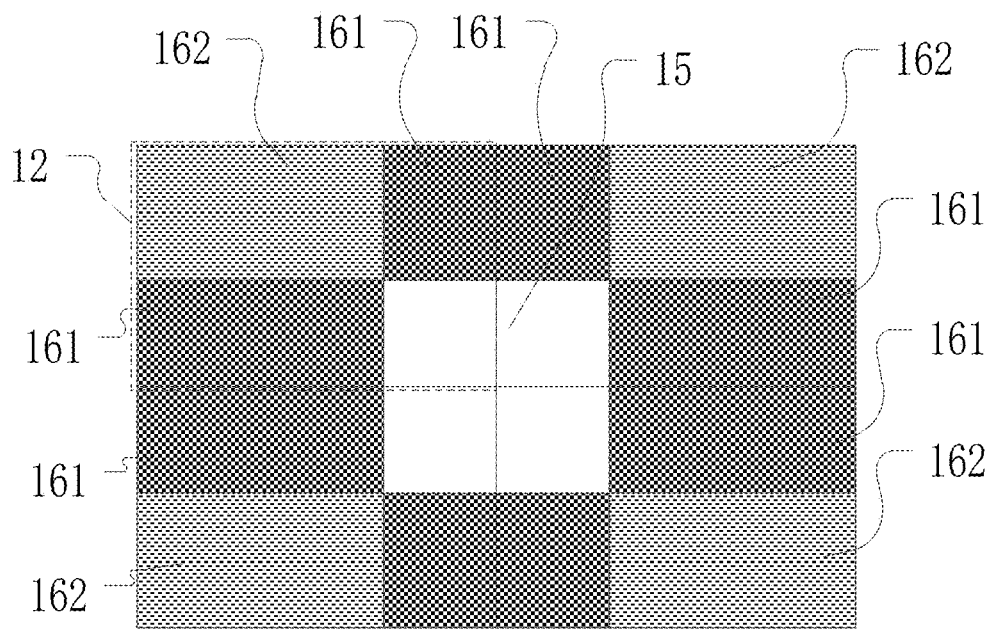
FIG. 17 is a state diagram that the spliced screen displays a picture to be displayed according to some embodiments of the present disclosure.

As shown in FIG. 17, it is a state diagram that the spliced screen displays a picture to be displayed according to some embodiments of the present disclosure. The picture to be displayed may include a display unit region 1, the display unit region 1 may include four sub-display regions of sub-display region 11, sub-display region 12, sub-display region 13, and sub-display region 14 in one-to-one correspondence with the sub-display screens. The sub-display regions are displayed on corresponding sub-display screens, and the display unit region 1 may further include a central region 15 and a non-central region 16 located around the central region 15. Among them, the non-central region 16 may be all regions except for the central region 15 in the display unit region 1. The central region 15 overlaps with each the sub-display region, and the non-central region 16 overlaps with each sub-display region. In the present exemplary embodiment, each sub-display region may include a splicing region 161 and a non-splicing region 162 located in the non-central region 16, the splicing region 161 includes side edges spliced with other sub-display regions, and the non-splicing region 162 does not include side edges spliced with other sub-display regions. In the present exemplary embodiment, the actual brightness gain of the splicing region 161 may be obtained by the foregoing method, and the actual brightness gain of the non-splicing region 162 may be equal to the product of the theoretical brightness gain of the sub-display region where the non-splicing region is located and the second coefficient.

Figure 18:
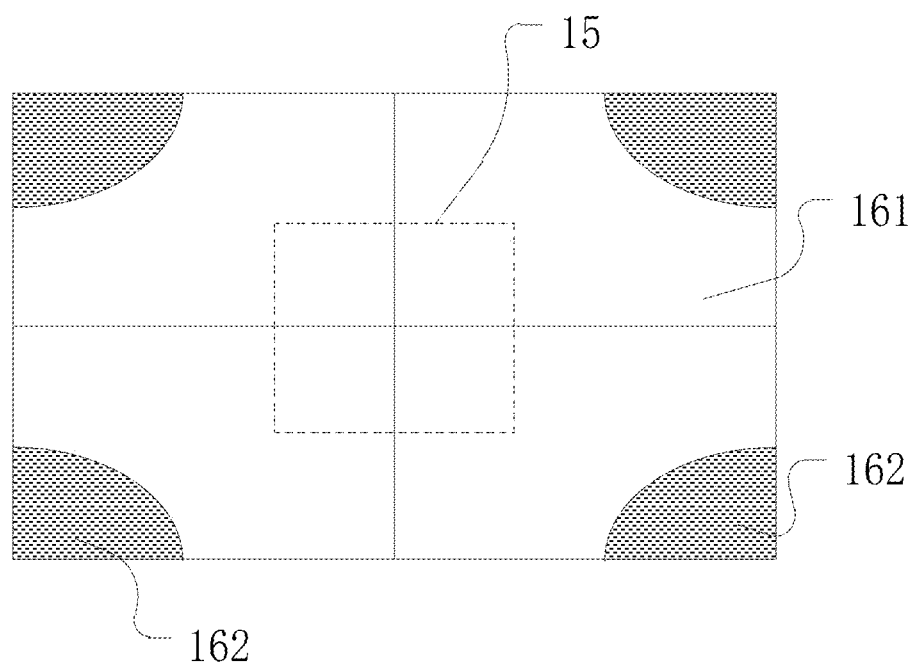
FIG. 18 is a state diagram that the spliced screen displays a picture to be displayed according to some embodiments of the present disclosure.

In the present exemplary embodiment, as shown in FIG. 17, the shape of the non-splicing region is rectangular. It should be understood that in other exemplary embodiments, as shown in FIG. 18, which is a state diagram that the spliced screen displays a picture to be displayed according to some embodiments of the present disclosure, the shape of the non-splicing region may also be other structures, such as an ellipse.

Figure 19:
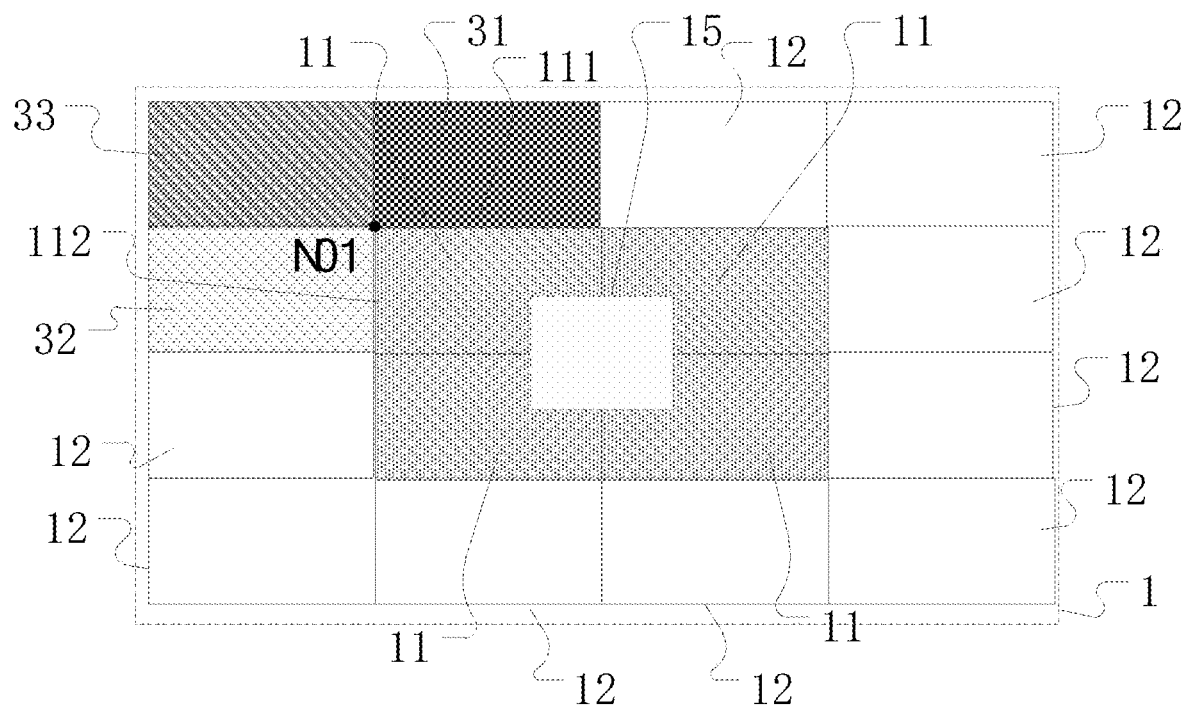
FIG. 19 is a state diagram that the spliced screen displays a picture to be displayed according to some embodiments of the present disclosure.

As shown in FIG. 19, it is a state diagram that the spliced screen displays a picture to be displayed according to some embodiments of the present disclosure. The display unit region 1 may include sixteen sub-display regions distributed in a four-by-four matrix, the plurality of sub-display regions may include four first sub-display regions 11 and twelve second sub-display regions 12. The first sub-display regions 11 are displayed on the sub-display screens corresponding to the first sub-display regions 11, and each first sub-display region 11 both overlaps with the central region 15 and the non-central region 16. The second sub-display regions 12 are displayed on the sub-display screens corresponding to the second sub-display regions 12, and the second sub-display regions 12 are located in the non-central region 16. In the present exemplary embodiment, the method for compensating may further include: obtaining actual brightness gains of the second sub-display regions 12 based on the actual brightness gains of the first sub-display regions 11. For example, as shown in FIG. 19, the plurality of first sub-display regions 11 are rectangles of the same shape and size, and the four first sub-display regions 11 are distributed in a two-by-two matrix. The central region 15 may be rectangular, the central region 15 partially overlaps with the four first sub-display regions 11, respectively; and, four side edges of the central region 15 are parallel to four side edges of any first sub-display region 11, respectively. The first sub-display region 11 may include a first side edge 111 and a second side edge 112 that are not intersected with the central region 15, and a first vertex N01 where the first side edge 111 is intersected with the second side edge 112. The region formed by the second sub-display regions 12 includes a first rectangular region 31, a second rectangular region 32, and a third rectangular region 33; the first rectangular region 31 includes a side edge spliced with the first side edge 111; the second rectangular region 32 includes a side edge spliced with the second side edge 112; the third rectangular region 33 is spliced with the first rectangular region 31 and the second rectangular region 32, and the vertex of the third rectangular region 33 is spliced with the first vertex N01.

obtaining the actual brightness gains of the second sub-display regions 12 based on the actual brightness gains of the first sub-display region 11 may include:

obtaining an actual brightness gain of any node on the first side edge 111 as an actual brightness gain of each node in the first rectangular region 31 in the same column as the node;

obtaining an actual brightness gain of any node on the second side 112 as an actual brightness gain of each node in the second rectangular region 32 in a same row as the node;

obtaining an actual brightness gain of the first vertex N01 as an actual brightness gain of the third rectangular region 33;

where, an extension direction of the first side edge 111 is a row direction, and an extension direction of the second side edge 112 is a column direction.

As shown in FIG. 19, the first rectangular region 31, the second rectangular region 32, and the third rectangular region 33 coincide with different sub-display regions, respectively. It should be understood that, in other exemplary embodiments, the display unit region 1 may further include other numbers of sub-display regions, and correspondingly, each rectangular region may also coincide with the plurality of sub-display regions.

Figure 20:
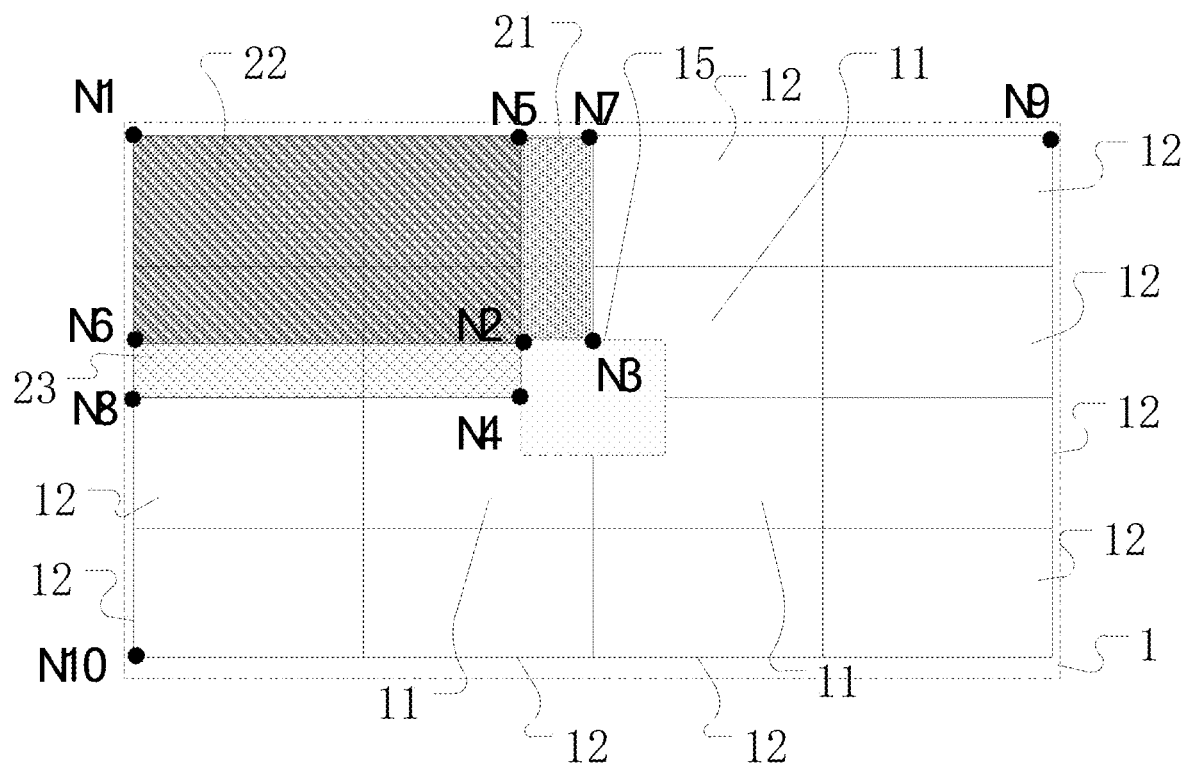
FIG. 20 is a state diagram that the spliced screen displays a picture to be displayed according to some embodiments of the present disclosure.

As shown in FIG. 20, it is a state diagram that the spliced screen displays a picture to be displayed according to some embodiments of the present disclosure. The shape of the display unit region in FIG. 20 is the same as the shape of the display unit region in FIG. 19. The actual brightness gain of the central region 15 in FIG. 20 may also be the product of the maximum theoretical brightness gain in all the sub-display regions in the display unit region 1 and the first coefficient. The first node on the non-central region may be located at the vertex and the edge of the display unit region 1. For example, the actual brightness gain of each node in the interpolation rectangle 21 in the non-central region may be obtained by bilinear interpolation of the nodes N5, N7, N2, and N3; the actual brightness gain of each node in the interpolation rectangle 22 in the non-central region may be obtained by bilinear interpolation of the nodes N1, N6, N2, and N5; and the actual brightness gain of each node in the interpolation rectangle 23 in the non-central region may be obtained by bilinear interpolation of the nodes N6, N8, N4, and N2. Among them, the actual brightness gain of the node N1, N9 or N10 is the product of the theoretical brightness gain of the sub-display region where the node N1, N9 or N10 is located and the second coefficient. The actual brightness gains of the nodes N5 and N7 are obtained by interpolation of the nodes N1 and N9, and the actual brightness gains of the nodes N6 and N8 may be obtained by interpolation of the nodes N1 and N10. The actual brightness gain of the node N2, N3 or N4 is the actual brightness gain of the central region.

Figure 21:
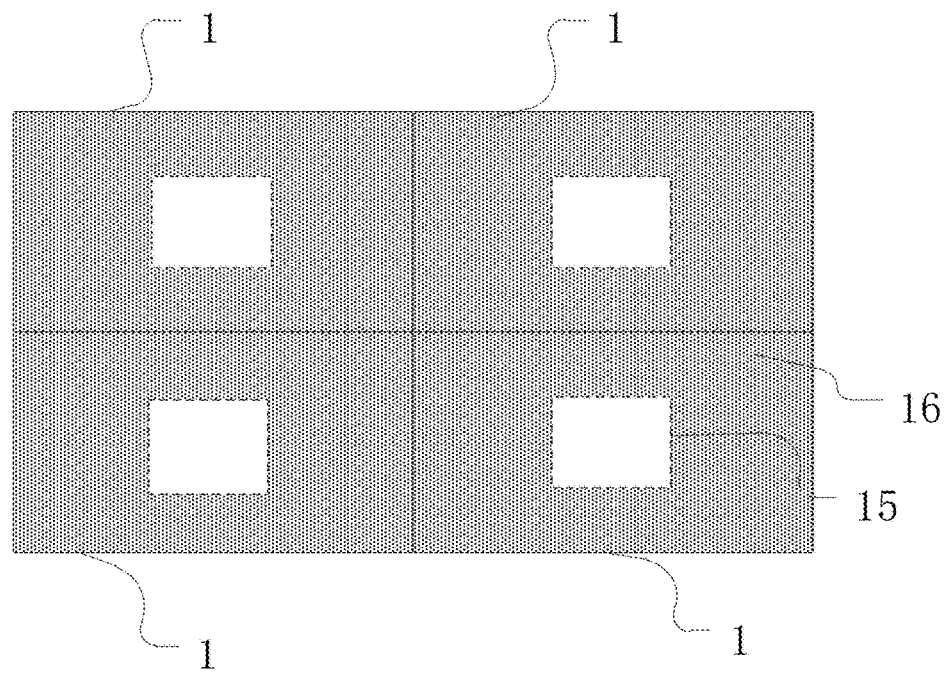
FIG. 21 is a state diagram that the spliced screen displays a picture to be displayed according to some embodiments of the present disclosure.

As shown in FIG. 21, it is a state diagram that the spliced screen displays a picture to be displayed according to some embodiments of the present disclosure. The picture to be displayed may include a plurality of display unit regions 1, each display unit region 1 includes a central region 15 and a non-central region 16 located around the central region 15. There may be a plurality of sub-display regions in each display unit region 1, and the plurality of sub-display regions in the same display unit region 1 may be of any shape and spliced in any manner.

Figure 22:
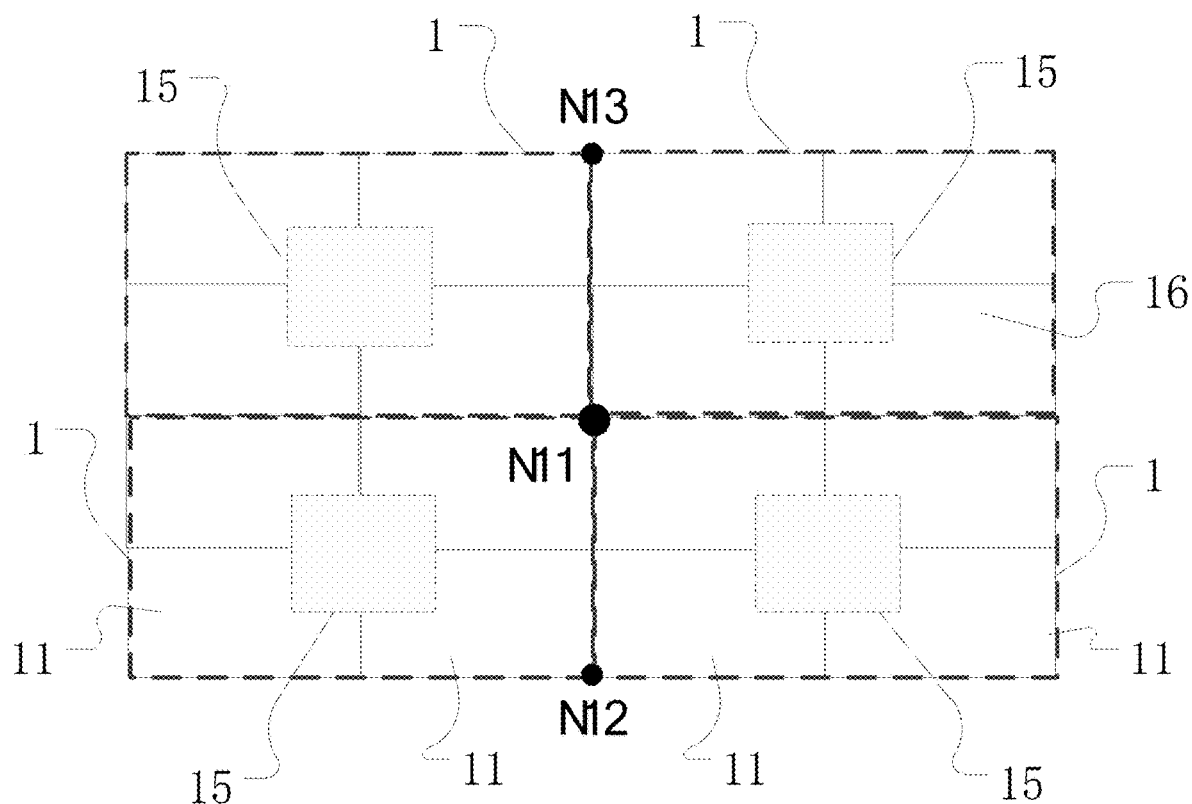
FIG. 22 is a state diagram that the spliced screen displays a picture to be displayed according to some embodiments of the present disclosure.

As shown in FIG. 22, it is a state diagram that the spliced screen displays a picture to be displayed according to some embodiments of the present disclosure. The picture to be displayed may include a plurality of display unit regions 1, each display unit region 1 may include four rectangular sub-display regions 11, and the four sub-display regions 11 are distributed in a two-by-two matrix structure. Among them, the algorithm for the actual brightness gain of each display unit region 1 may be the same as the algorithm for the picture to be displayed shown in FIG. 10. In addition, in other exemplary embodiments, in order to avoid the brightness difference between the boundary of adjacent display unit regions 1, when the actual brightness gain of the intersection vertex of the adjacent display unit regions 1 is obtained, the product of the minimum theoretical brightness gain in the sub-display regions where the vertex is located and the second coefficient can be obtained as the actual brightness gain of the vertex. For example, the actual brightness gain of the intersection vertex N11 of the adjacent display unit regions in FIG. 22 may be the product of the minimum theoretical brightness gain in the four sub-display regions where the vertex N11 is located and the second coefficient; the actual brightness gain of the intersection vertex N12 of the adjacent display unit regions in FIG. 22 may be the product of the minimum theoretical brightness gain in the two sub-display regions where the vertex N12 is located and the second coefficient; and the actual brightness gain of the intersection vertex N13 of the adjacent display unit regions in FIG. 22 may be the product of the minimum theoretical brightness gain in the two sub-display regions where the vertex N13 is located and the second coefficient.

Figure 23:
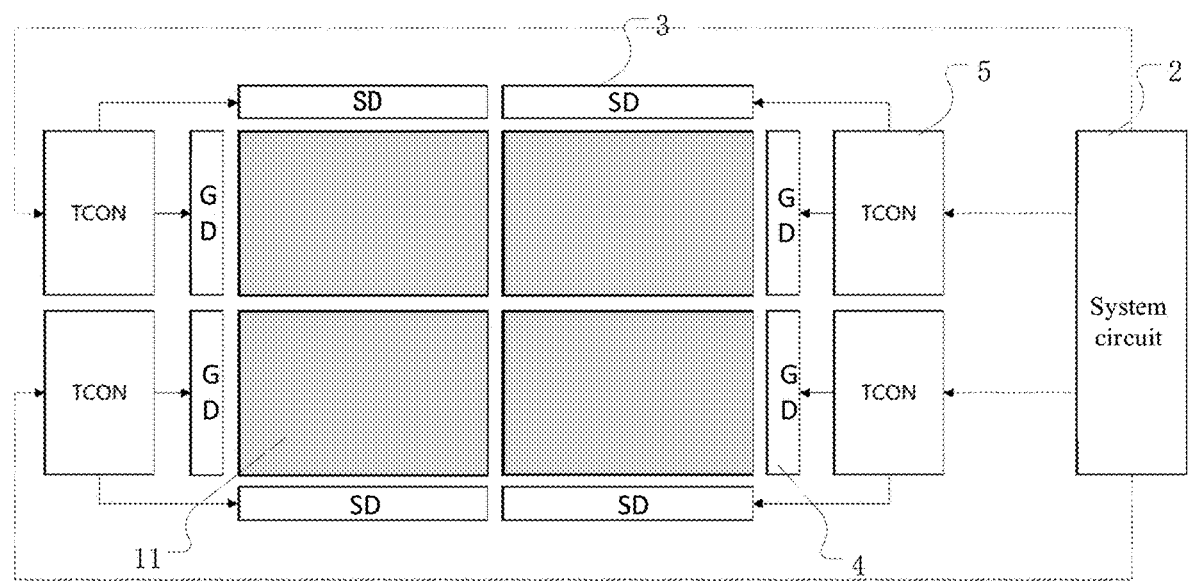
FIG. 23 is a schematic structural diagram of a spliced screen according to some embodiments of the present disclosure.

The present exemplary embodiment further provides a spliced screen, where, as shown in FIG. 23, it is a schematic structural diagram of a spliced screen according to some embodiments of the present disclosure. The spliced screen includes: a plurality of sub-display screens 11, a system circuit 2, a plurality of source driving circuits 3, a plurality of gate driving circuits 4, and a plurality of timing controllers 5. System circuit 2 can compensate the picture to be displayed according to the method for compensating, so as to obtain an actually displayed picture; the plurality of source driving circuits 3 are provided in one-to-one correspondence with the plurality of sub-display screens 11; the plurality of gate driving circuits 4 are provided in one-to-one correspondence with the plurality of sub-display screens 11; the plurality of timing controllers 5 are provided in one-to-one correspondence with the plurality of source driving circuits 3, and are connected to the system circuit 2. The timing controllers 5 are configured to drive the source driving circuits 3 and the gate driving circuits 4 to input driving signals to the sub-display screens based on the actually displayed picture. The driving signals may include source driving signals provided by the source driving circuits and gate driving signals provided by the gate driving circuits. Among them, the system circuit may be integrated on a system on chip (SoC) of the spliced screen.

In other exemplary embodiments, the system circuit may only obtain the actual brightness gain of the picture to be displayed, and compensate the picture to be displayed through the timing controller 5, so as to obtain the actually displayed picture.

Other embodiments of the present disclosure will be apparent to those skilled in the art from consideration of the specification and practice of the present disclosure. The present disclosure is intended to cover any variations, uses, or adaptations of the present disclosure following the general principles of the present disclosure and including common general knowledge or conventional technical means in the art not disclosed in the present disclosure. The specification and embodiments are considered as examples, and the true scope and spirit of the present disclosure are indicated by the claims.

It should be understood that the present disclosure is not limited to the precise construction that has been described above and illustrated in the accompanying drawings, and that various modifications and changes may be made without departing from the scope of the present disclosure. The scope of the present disclosure is defined only by the appended claims.

What is claimed is:

1. A method for compensating display of a spliced screen, the spliced screen comprising a plurality of sub-display screens, wherein the method for compensating comprises:
   obtaining a picture to be displayed, the picture to be displayed comprising at least one display unit region, the display unit region comprising a plurality of sub-display regions in one-to-one correspondence with the sub-display screens, a sub-display region being displayed on a sub-display screen corresponding to the sub-display region, and the display unit region further comprising a central region and a non-central region located around the central region;
   obtaining a theoretical brightness gain of at least one sub-display region in the plurality of sub-display regions;
   obtaining an actual brightness gain of the central region according to the theoretical brightness gain of at least part of the sub-display regions, and obtaining actual brightness gains of a plurality of first nodes in the non-central region according to the theoretical brightness gain of at least part of the sub-display regions;
   obtaining an actual brightness gain of at least part of the non-central region by using a bilinear interpolation method according to the actual brightness gains of the plurality of first nodes and an actual brightness gain of at least one second node on the central region;
   wherein the actual brightness gain of the central region is greater than or equal to the actual brightness gain of the non-central region; and
   compensating the picture to be displayed based on an actual brightness gain of the picture to be displayed to obtain an actually displayed picture.

2. The method for compensating display of the spliced screen according to claim 1, wherein obtaining the theoretical brightness gain of at least one sub-display region comprises:

obtaining total brightness information of the sub-display region displayed on the sub-display screen as Lt according to a gray scale value of each sub-pixel unit in the sub-display region;

obtaining a maximum power consumption value of the sub-display screen as Lm;

obtaining a brightness proportion value of the sub-display region as Lt/Lm; and obtaining the theoretical brightness gain of the sub-display region by using a preset database according to the brightness proportion value of the sub-display region, the database comprising a mapping relationship between the brightness proportion value of the sub-display region and the theoretical brightness gain of the sub-display region.

3. The method for compensating display of the spliced screen according to claim 2, wherein obtaining the total brightness information of the sub-display region displayed on the sub-display screen according to the gray scale value of each sub-pixel unit in the sub-display region comprises:

obtaining a brightness value of each sub-pixel unit in each pixel unit according to the gray scale value of each sub-pixel unit in each pixel unit on the sub-display region;

obtaining brightness information of each sub-pixel unit in a corresponding pixel unit on the sub-display screen according to the brightness value of each sub-pixel unit in each pixel unit on the sub-display region; and obtaining the total brightness information of the sub-display region displayed on the sub-display screen by summing brightness information of all sub-pixel units on the sub-display screen.

4. The method for compensating display of the spliced screen according to claim 3, wherein, obtaining the brightness value of each sub-pixel unit in each pixel unit according to the gray scale value of each sub-pixel unit in each pixel unit on the sub-display region comprises:

obtaining, in a same pixel unit, a brightness value of a R sub-pixel unit as Lr, a brightness value of a G sub-pixel unit as Lg, and a brightness value of a B sub-pixel unit as Lb, by using a formula $L=[GL/(2^i-1)]^{gam} \times (2^j-1)$;

wherein, L represents a brightness value, GL represents a gray scale value, gam represents a gamma value, i and j are positive integers greater than or equal to 1; and when a pixel unit in the sub-display region comprises an R sub-pixel unit, a G sub-pixel unit, and a B sub-pixel unit, and when a pixel unit in the sub-display screen comprises an R sub-pixel unit, a G sub-pixel unit, a B sub-pixel unit, and a W sub-pixel unit, obtaining the brightness information of each sub-pixel unit in a corresponding pixel unit on the sub-display screen according to the brightness value of each sub-pixel unit in each pixel unit on the sub-display region comprises:

obtaining, in the corresponding pixel unit on the sub-display screen:

brightness information of the W sub-pixel unit as L'w=Min (Lr, Lg, Lb);

brightness information of the R sub-pixel unit as L'r=Lr−L'w;

brightness information of the G sub-pixel unit as L'g=Lg−L'w; and brightness information of the B sub-pixel unit as L'b=Lb−L'w.

5. The method for compensating display of the spliced screen according to claim 2, wherein, when a pixel unit in the sub-display region comprises an R sub-pixel unit, a G sub-pixel unit and a B sub-pixel unit, and when a pixel unit in the sub-display screen comprises an R sub-pixel unit, a G sub-pixel unit, a B sub-pixel unit and a W sub-pixel unit, obtaining the maximum power consumption value of the sub-display screen as Lm, comprises:

obtaining the maximum power consumption value of the sub-display screen by using a formula $Lm=K \times 2 \times (2^j-1)$;

wherein, Lm is the maximum power consumption value of the sub-display screen, and K is a number of pixel units on the sub-display screen.

6. The method for compensating display of the spliced screen according to claim 1, wherein in a same display unit region, the plurality of sub-display regions comprise a plurality of first sub-display regions, the central region overlaps with each first sub-display region, the non-central region overlaps with the plurality of first sub-display regions, and obtaining the actual brightness gain of the central region according to the theoretical brightness gain of at least part of the sub-display regions comprises:

obtaining a maximum theoretical brightness gain in the plurality of first sub-display regions according to a theoretical brightness gain of each first sub-display region; and taking a product of the maximum theoretical brightness gain and a first coefficient as the actual brightness gain of the central region, the first coefficient being greater than or equal to 1.

7. The method for compensating display of the spliced screen according to claim 1, wherein in a same display unit region, the plurality of sub-display regions comprise a plurality of first sub-display regions, the central region overlaps with each first sub-display region, and the non-central region overlaps with the plurality of first sub-display regions; and obtaining the actual brightness gains of the plurality of first nodes in the non-central region according to the theoretical brightness gain of at least part of the sub-display regions, comprises:

obtaining the plurality of first nodes, the plurality of first nodes comprising a plurality of first sub-nodes and a plurality of second sub-nodes, the plurality of first sub-nodes being respectively located at each vertex of a first pattern, the second sub-nodes being located on side edges of the first pattern, and the plurality of first sub-display regions enclosing and forming the first pattern;

obtaining a product of a theoretical brightness gain of a first sub-display region where a first sub-node is located and a second coefficient as an actual brightness gain of the first sub-node, the second coefficient being less than or equal to 1; and obtaining, according to actual brightness gains of two first sub-nodes, an actual brightness gain of a second sub-node located on a same side of the first pattern as the two first sub-nodes through a linear interpolation method.

8. The method for compensating display of the spliced screen according to claim 1, wherein in a same display unit region, the plurality of sub-display regions comprise a plurality of first sub-display regions, the central region overlaps with each first sub-display region, and the non-central region overlaps with the plurality of first sub-display regions;

the plurality of first nodes comprise a plurality of first sub-nodes and a plurality of second sub-nodes, the plurality of first sub-nodes are respectively located at each vertex of a first pattern, the second sub-nodes are located side edges of the first pattern, and the plurality of first sub-display regions enclose and form the first pattern; and obtaining the actual brightness gain of at least part of the non-central region by using a bilinear interpolation method according to the actual brightness gains of the plurality of first nodes and the actual brightness gain of at least one second node on the central region, comprises:

obtaining the second node on the central region, the second node and the plurality of first nodes being respectively located at four vertices of a same interpolation rectangle and being located in a same first sub-display region; and obtaining an actual brightness gain of the non-central region in the interpolation rectangle by using actual brightness gains of the first nodes and the second node located at the four vertices of the same interpolation rectangle through the bilinear interpolation method.

9. The method for compensating display of the spliced screen according to claim 8, wherein the second node is located at an edge of the central region.

10. The method for compensating display of the spliced screen according to claim 9, wherein the first sub-display region is rectangular, the display unit region comprises four first sub-display regions distributed in a two-by-two matrix, and the four first sub-display regions form the first pattern of a rectangular structure;

the central region is rectangular, the central region partially overlaps with the four first sub-display regions respectively, and four side edges of the central region are respectively parallel to four side edges of the first pattern;

in a same first sub-display region, a first sub-node comprises a first sub-subnode; the second node comprises a second sub-subnode, a third sub-subnode, and a fourth sub-subnode;

the second sub-subnode is located on a vertex of the central region; the third sub-subnode and the fourth sub-subnode are located on intersection points between edges of the central region and edges of the first sub-display region; and the second sub-node comprises a fifth sub-subnode, a sixth sub-subnode, a seventh sub-subnode, and an eighth sub-subnode;

the first sub-subnode, the fifth sub-subnode, the second sub-subnode and the sixth sub-subnode form four vertices of an interpolation rectangle; the second sub-subnode, the third sub-subnode, the seventh sub-subnode and the fifth sub-subnode form four vertices of an interpolation rectangle; and the second sub-subnode, the sixth sub-subnode, the eighth sub-subnode and the fourth sub-subnode form four vertices of an interpolation rectangle.

11. The method for compensating display of the spliced screen according to claim 1, wherein, in a same display unit region, the plurality of sub-display regions comprise a plurality of first sub-display regions, the central region overlaps with each first sub-display region, the non-central region overlaps with the plurality of first sub-display regions, the first sub-display region comprises a splicing region and a non-splicing region located in the non-central region, and the splicing region comprises side edges spliced with other first sub-display regions;

an actual brightness gain of the splicing region is obtained by using a bilinear interpolation method according to the actual brightness gains of the plurality of first nodes and the actual brightness gain of at least one second node on the central region; and an actual brightness gain of the non-splicing region is equal to a product of a theoretical brightness gain of a first sub-display region where the non-splicing region is located and a second coefficient, and the second coefficient is less than or equal to 1.

12. The method for compensating display of the spliced screen according to claim 1, wherein, in a same display unit region, the plurality of sub-display regions comprise a plurality of first sub-display regions, the central region overlaps with each first sub-display region, and the non-central region overlaps with the plurality of first sub-display regions;

in the same display unit region, the plurality of sub-display regions further comprise a plurality of second sub-display regions in one-to-one correspondence with the sub-display screens, a second sub-display region is displayed on the sub-display screen corresponding to the second sub-display region, and the second sub-display region is located in the non-central region; and the method for compensating further comprises:

obtaining an actual brightness gain of the second sub-display region based on an actual brightness gain of the first sub-display region.

13. The method for compensating display of the spliced screen according to claim 12, wherein the plurality of first sub-display regions are rectangular, the display unit region comprises four first sub-display regions distributed in a two-by-two matrix, and the four first sub-display regions form a first pattern of a rectangular structure;

the central region is rectangular, the central region partially overlaps with the four first sub-display regions respectively, and four side edges of the central region are respectively parallel to four side edges of the first pattern;

the first sub-display region comprises a first side edge and a second side edge that are not intersected with the central region, and a first vertex where the first side edge is intersected with the second side edge;

a region formed by the second sub-display regions comprises:

a first rectangular region, comprising a side edge spliced with the first side edge;

a second rectangular region, comprising a side edge spliced with the second side edge; and a third rectangular region, connected to the first rectangular region and the second rectangular region, and comprising a vertex spliced with the first vertex; and obtaining the actual brightness gain of the second sub-display region based on the actual brightness gain of the first sub-display region, comprises:

obtaining an actual brightness gain of a node on the first side edge as an actual brightness gain of each node in the first rectangular region in a same column as the node on the first side edge;

obtaining an actual brightness gain of a node on the second side edge as an actual brightness gain of each node in the second rectangular region in a same row as the node on the second side edge; and obtaining an actual brightness gain of a first node as an actual brightness gain of the third rectangular region;

wherein an extension direction of the first side edge is a row direction, and an extension direction of the second side edge is a column direction.

14. The method for compensating display of the spliced screen according to claim 1, wherein the picture to be displayed comprises a plurality of display unit regions, and each display unit region comprises the central region and the non-central region located around the central region.

15. The method for compensating display of the spliced screen according to claim 14, wherein in a same display unit region, the plurality of sub-display regions comprise four rectangular first sub-display regions, and the four first sub-display regions are distributed in a two-by-two matrix structure;
- the central region partially overlaps with each first sub-display region, and the non-central region partially overlaps with each first sub-display region; and
- obtaining the actual brightness gains of the plurality of first nodes in the non-central region according to the theoretical brightness gain of at least part of the sub-display regions, comprises:
- obtaining the plurality of first nodes, the plurality of first nodes comprising a plurality of first sub-nodes and a plurality of second sub-nodes, the plurality of first sub-nodes being respectively located at each vertex of a first pattern, the second sub-nodes being located on side edges of the first pattern, and the plurality of first sub-display regions enclosing and forming the first pattern;
- obtaining a minimum theoretical brightness gain of the first sub-display regions with the first sub-nodes as vertices, and obtaining a product of the minimum theoretical brightness gain and a second coefficient as an actual brightness gain of a first sub-node, the second coefficient being less than or equal to 1; and
- obtaining, according to actual brightness gains of two first sub-nodes, an actual brightness gain of a second sub-node located on a same side of the first pattern as the two first sub-nodes through a linear interpolation method, in the same display unit region.

16. The method for compensating display of the spliced screen according to claim 14, wherein compensating the picture to be displayed based on the actual brightness gain of the picture to be displayed to obtain the actually displayed picture, comprises:
- taking a product of the brightness information of each sub-pixel unit on the sub-display screens and the actual brightness gain corresponding to the sub-pixel unit as actual brightness information of the sub-pixel unit; and
- obtaining an actual gray scale value of the sub-pixel unit according to the actual brightness information of the sub-pixel unit, the actual gray scale value of each sub-pixel unit on the sub-display screens forming the actually displayed picture.

17. A spliced screen, wherein the spliced screen comprises:
- a plurality of sub-display screens;
- a system circuit, used for:
- obtaining a picture to be displayed, the picture to be displayed comprising at least one display unit region, the display unit region comprising a plurality of sub-display regions in one-to-one correspondence with the sub-display screens, a sub-display region being displayed on a sub-display screen corresponding to the sub-display region, and the display unit region further comprising a central region and a non-central region located around the central region;
- obtaining a theoretical brightness gain of at least one sub-display region in the plurality of sub-display regions;
- obtaining an actual brightness gain of the central region according to the theoretical brightness gain of at least part of the sub-display regions, and obtaining actual brightness gains of a plurality of first nodes in the non-central region according to the theoretical brightness gain of at least part of the sub-display regions;
- obtaining an actual brightness gain of at least part of the non-central region by using a bilinear interpolation method according to the actual brightness gains of the plurality of first nodes and an actual brightness gain of at least one second node on the central region;
- wherein the actual brightness gain of the central region is greater than or equal to the actual brightness gain of the non-central region; and
- compensating the picture to be displayed based on an actual brightness gain of the picture to be displayed to obtain an actually displayed picture;
- a plurality of source driving circuits, provided in one-to-one correspondence with the plurality of sub-display screens;
- a plurality of gate driving circuits, provided in one-to-one correspondence with the plurality of sub-display screens; and
- a plurality of timing controllers, provided in one-to-one correspondence with the plurality of source driving circuits and connected to the system circuit, the timing controllers being used for driving the source driving circuits and the gate driving circuits to input driving signals to the sub-display screens based on the actually displayed picture.

18. The spliced screen according to claim 17, wherein obtaining the theoretical brightness gain of at least one sub-display region comprises:
- obtaining total brightness information of the sub-display region displayed on the sub-display screen as Lt according to a gray scale value of each sub-pixel unit in the sub-display region;
- obtaining a maximum power consumption value of the sub-display screen as Lm;
- obtaining a brightness proportion value of the sub-display region as Lt/Lm; and
- obtaining the theoretical brightness gain of the sub-display region by using a preset database according to the brightness proportion value of the sub-display region, the database comprising a mapping relationship between the brightness proportion value of the sub-display region and the theoretical brightness gain of the sub-display region.

19. The spliced screen according to claim 18, wherein obtaining the total brightness information of the sub-display region displayed on the sub-display screen according to the gray scale value of each sub-pixel unit in the sub-display region comprises:
- obtaining a brightness value of each sub-pixel unit in each pixel unit according to the gray scale value of each sub-pixel unit in each pixel unit on the sub-display region;
- obtaining brightness information of each sub-pixel unit in a corresponding pixel unit on the sub-display screens according to the brightness value of each sub-pixel unit in each pixel unit on the sub-display region; and
- obtaining the total brightness information of the sub-display region displayed on the sub-display screen by summing brightness information of all sub-pixel units on the sub-display screen.

20. The spliced screen according to claim 19, wherein, obtaining the brightness value of each sub-pixel unit in each pixel unit according to the gray scale value of each sub-pixel unit in each pixel unit on the sub-display region comprises:

obtaining, in a same pixel unit, a brightness value of a R sub-pixel unit as Lr, a brightness value of a G sub-pixel unit as Lg, and a brightness value of a B sub-pixel unit as Lb, by using a formula $L=[GL/(2^i-1)]^{gam} \times (2^j-1)$; wherein, L represents a brightness value, GL represents a gray scale value, gam represents a gamma value, i and j are positive integers greater than or equal to 1; and when a pixel unit in the sub-display region comprises an R sub-pixel unit, a G sub-pixel unit, and a B sub-pixel unit, and when a pixel unit in the sub-display screen comprises an R sub-pixel unit, a G sub-pixel unit, a B sub-pixel unit, and a W sub-pixel unit, obtaining the brightness information of each sub-pixel unit in a corresponding pixel unit on the sub-display screen according to the brightness value of each sub-pixel unit in each pixel unit on the sub-display region comprises:

obtaining, in the corresponding pixel unit on the sub-display screen:

brightness information of the W sub-pixel unit as $L'w=Min(Lr, Lg, Lb)$;

brightness information of the R sub-pixel unit as $L'r=Lr-L'w$;

brightness information of the G sub-pixel unit as $L'g=Lg-L'w$; and brightness information of the B sub-pixel unit as $L'b=Lb-L'w$.

* * * * *